US010353819B2

(12) United States Patent
Dwiel et al.

(10) Patent No.: US 10,353,819 B2
(45) Date of Patent: Jul. 16, 2019

(54) NEXT LINE PREFETCHERS EMPLOYING INITIAL HIGH PREFETCH PREDICTION CONFIDENCE STATES FOR THROTTLING NEXT LINE PREFETCHES IN A PROCESSOR-BASED SYSTEM

(71) Applicant: QUALCOMM Incorporated, San Diego, CA (US)

(72) Inventors: Brandon Dwiel, Jamaica Plain, MA (US); Rami Mohammad Al Sheikh, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 15/192,416

(22) Filed: Jun. 24, 2016

(65) Prior Publication Data

US 2017/0371790 A1    Dec. 28, 2017

(51) Int. Cl.
*G06F 13/00* (2006.01)
*G06F 12/0862* (2016.01)
(Continued)

(52) U.S. Cl.
CPC ........ *G06F 12/0862* (2013.01); *G06F 9/3802* (2013.01); *G06F 12/0811* (2013.01); *G06F 2212/1021* (2013.01); *G06F 2212/1024* (2013.01); *G06F 2212/283* (2013.01); *G06F 2212/452* (2013.01); *G06F 2212/602* (2013.01)

(58) Field of Classification Search
CPC .......................... G06F 9/3802; G06F 12/0811
See application file for complete search history.

(56) References Cited

U.S. PATENT DOCUMENTS 6,438,673 B1 * 8/2002 Jourdan ................. G06F 9/383
                                                                711/213
8,255,631 B2    8/2012 Chen et al.
(Continued)

OTHER PUBLICATIONS

International Search Report and Written Opinion for PCT/US2017/035908, dated Sep. 29, 2017, 13 pages.

*Primary Examiner* — Ryan Bertram
*Assistant Examiner* — Trang K Ta
(74) *Attorney, Agent, or Firm* — Withrow & Terranova, PLLC

(57) ABSTRACT

Next line prefetchers employing initial high prefetch prediction confidence states for throttling next line prefetches in processor-based system are disclosed. Next line prefetcher prefetches a next memory line into cache memory in response to read operation. To mitigate prefetch mispredictions, next line prefetcher is throttled to cease prefetching after prefetch prediction confidence state becomes a no next line prefetch state indicating number of incorrect predictions. Instead of initial prefetch prediction confidence state being set to no next line prefetch state, which is built up in response to correct predictions before performing a next line prefetch, initial prefetch prediction confidence state is set to next line prefetch state to allow next line prefetching. Thus, next line prefetcher starts prefetching next lines before requiring correct predictions to be "built up" in prefetch prediction confidence state. CPU performance may be increased, because prefetching begins sooner rather than waiting for correct predictions to occur.

30 Claims, 11 Drawing Sheets

(51) Int. Cl.
*G06F 12/0811* (2016.01)
*G06F 9/38* (2018.01)

(56) References Cited

U.S. PATENT DOCUMENTS

| | | | |
|---|---|---|---|
| 8,880,844 B1 * | 11/2014 | Bhattacharjee | G06F 12/0215 707/741 |
| 9,116,815 B2 | 8/2015 | McCauley et al. | |
| 2003/0079088 A1 | 4/2003 | Malik | |
| 2006/0248280 A1 * | 11/2006 | Al-Sukhni | G06F 9/383 711/137 |
| 2008/0276081 A1 | 11/2008 | Nair | |
| 2011/0161587 A1 | 6/2011 | Guthrie et al. | |
| 2012/0124345 A1 | 5/2012 | Denman et al. | |
| 2012/0131311 A1 * | 5/2012 | Chou | G06F 12/0862 712/207 |
| 2012/0317364 A1 | 12/2012 | Loh | |
| 2014/0108740 A1 | 4/2014 | Rafacz et al. | |
| 2014/0129772 A1 * | 5/2014 | Kalamatianos | G06F 12/0862 711/119 |
| 2015/0331691 A1 | 11/2015 | Levitan et al. | |

\* cited by examiner

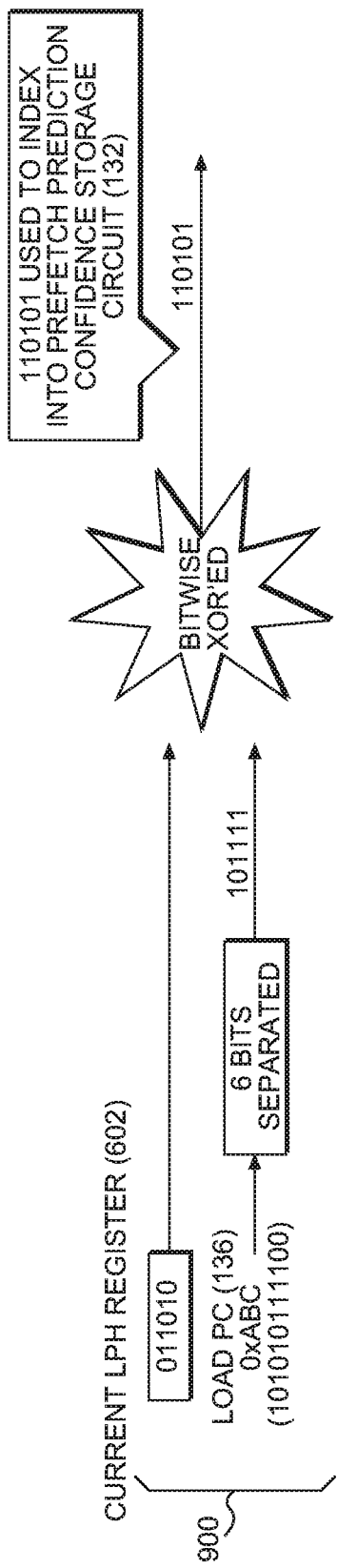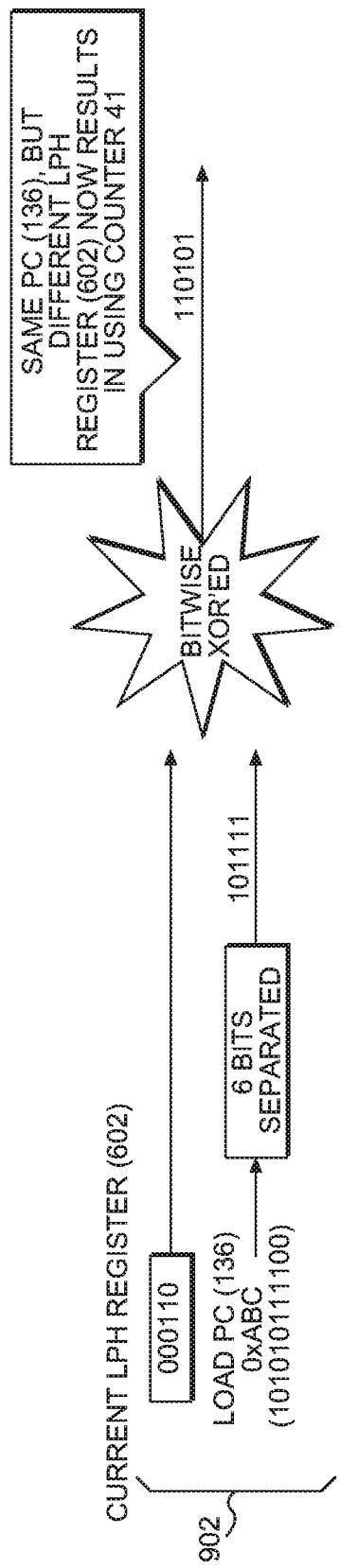
FIG. 9A
FIG. 9B

NEXT LINE PREFETCHERS EMPLOYING INITIAL HIGH PREFETCH PREDICTION CONFIDENCE STATES FOR THROTTLING NEXT LINE PREFETCHES IN A PROCESSOR-BASED SYSTEM

BACKGROUND

I. Field of the Disclosure

The technology of the disclosure relates generally to cache memory provided in computer systems, and more particularly to prefetching of data into cache memory to reduce cache misses.

II. Background

Central processing units (CPUs), also known as microprocessors, perform computational tasks in a wide variety of applications. A typical CPU includes one or more processor cores that are each configured to execute software instructions. The software instructions may instruct a processor core to fetch data from a location in memory as part of a memory read operation, perform one or more CPU operations using the fetched data, and generate a result. The result may then be stored back into memory as a memory write operation. Thus, a CPU's workload performance is tied to wait time for data to be accessed from memory in a memory read operation. One way to improve CPU workload performance is to employ cache memory. Cache memory, which can also be referred to as simply "cache," is a smaller, faster memory that stores copies of data stored at frequently accessed memory addresses in main memory or higher level cache memory to reduce memory access latency. Thus, cache can be used by a CPU to reduce memory access times. For example, cache may be used to store instructions fetched by a CPU for faster instruction execution. As another example, cache may be used to store data to be fetched by a CPU for faster data access. Cache memory can include a cache local to a CPU, a shared local cache among CPUs in a CPU block, and/or a shared cache among multiple CPU blocks.

Cache misses that occur when data to be accessed is not present in the cache are a substantial source of performance degradation for many applications running on a variety of computer systems. To reduce the number of cache misses, computer systems may employ prefetching. Prefetching is a technique in which a prefetcher (also known as a prefetch engine) is provided to make predictions on memory addresses that will be accessed in the near future for memory read operations. The prefetcher can be configured to detect memory access patterns in a computer system to predict future memory accesses. Using these predictions, the prefetcher will make requests to a higher level memory to speculatively preload cache lines into the cache. Cache lines stored at these memory addresses are brought into the cache before they are actually demanded. When these cache lines are needed, the cache lines are already present in the cache, and no cache miss penalty is incurred as a result. Thus, correct predictions of memory addresses by the prefetcher can reduce the number of cycles a load stalls waiting for data.

Although many applications benefit from prefetching, some applications have memory access patterns that are difficult to predict. Enabling prefetching for these applications may significantly reduce performance as a result. In these cases, the prefetcher may request cache lines to be filled in the cache that may never be used by the application. Further, to make room for the prefetched cache lines in the cache, useful cache lines may then be displaced. If a prefetched cache line is not subsequently accessed before a previously displaced cache line is accessed, a cache miss is generated for access to the previously displaced cache line. The cache miss in this scenario was effectively caused by the prefetch operation. The process of displacing a later-accessed cache line with a non-referenced prefetched cache line is referred to as "cache pollution." Cache pollution can increase cache miss rate, which decreases performance.

Various cache data replacement policies (referred to as "prefetch policies") exist that can be employed by a prefetcher to attempt to limit cache pollution as a result of prefetching cache lines into a cache. One example of a prefetcher is a stream prefetcher. A stream prefetcher detects access streams to sequential memory addresses. Another example is a global history prefetcher that identifies and records address or stride patterns, and makes predictions when that pattern begins repeating in the future. A common feature of these two types of prefetchers is that they use history to build confidence before making a prediction. For example, a stream prefetcher may wait until three or more uninterrupted accesses are confirmed before issuing a prediction. This feature inherently increases the accuracy of predictions by requiring a confidence threshold to be exceeded before prefetching a prediction, thus reducing cache pollution. However, several accesses may be required before the prefetcher is "confident" enough to make a prediction to prefetch data into a cache.

An example of a prefetcher that does not require confidence to make a prediction is a next line prefetcher. A next line prefetcher has an advantage that it does not require several accesses before it is confident enough to make a prediction. A next line prefetcher prefetches the next sequential line after a miss in the cache. A next line prefetcher does not rely on history to make predictions, and instead assumes there is spatial locality, and that the nearby addresses will be accessed shortly after. Thus, a next line prefetcher has a lower overhead in that circuitry is not required to track access history, thereby consuming area and additional power. A next line prefetcher is also useful for workloads that work on many objects in memory, and those objects span multiple cache lines. When iterating over these objects, accessing the first cache line of an object will trigger a prefetch to the next line, which contains the remaining part of the object. A next line prefetcher can prefetch starting with the second cache line of an object. However, the lack of confidence in a next line prefetcher causes mispredicted addresses if only one cache line per object is accessed or if the object only spans one cache line. Further, a next line prefetcher can result in increased cache pollution, structural hazards, and performance loss with less power efficiency when non-useful cache lines are prefetched.

SUMMARY OF THE DISCLOSURE

Aspects disclosed herein include next line prefetchers employing initial high prefetch prediction confidence states for throttling next line prefetches in a processor-based system. In this regard, in an exemplary aspect disclosed herein, one or more cache memory systems provided in the processor-based system include a next line prefetcher. The next line prefetcher is configured to prefetch a next memory line (e.g., a next sequential memory line) into a cache memory in response to a memory load instruction based on a prefetch prediction confidence state. The prefetch prediction confidence state becomes a next line prefetch state, thus allowing next line prefetches in response to correct predictions. The prefetch prediction confidence state becomes a no next line prefetch state in response to incorrect predictions. Next line prefetchers have an advantage over other prefetchers by not requiring memory structures to store previously accessed addresses for tracking memory address patterns, thus requiring less area and power consumption. However, to mitigate prefetch mispredictions that can increase cache pollution (i.e., an access occurs sooner to the cache line replaced by the prefetched data), the next line prefetcher is configured to be throttled to cease prefetching after the prefetch prediction confidence state exceeds a defined prefetch confidence state indicating a number of incorrect predictions. Instead of an initial prefetch prediction confidence state being required to build up (e.g., through a next line prefetch prediction confidence counter) from a no next line prefetch state to a next line prefetch state in response to correct predictions to allow next line prefetching, the initial prefetch prediction confidence state is set to the next line prefetch state. Thus, the next line prefetcher starts prefetching next lines before first requiring correct predictions to be "built up" in the prefetch prediction confidence state. Central processing unit (CPU) workload performance may be increased as a result, because prefetching begins sooner rather than waiting for a number of correct predictions to occur. However, if the prefetch prediction confidence state becomes a no next line prefetch state as a result of mispredictions, the next line prefetcher is throttled to cease prefetching. Next line prefetching by the next line prefetcher is unthrottled once the prefetch prediction confidence state becomes a next line prefetch state based on a correct prediction(s).

As a non-limiting example, the prefetch prediction confidence state may be tracked using a prefetch prediction confidence count stored in a next line prefetch prediction confidence counter. The number of next line prefetch prediction confidence counters is configurable based on design and performance considerations among area, power consumption, and accuracy. For example, a higher prediction accuracy may result from providing separate next line prefetch prediction confidence counters specifically assigned to instruction addresses for memory load instructions and used to predict a next line prefetch. However, this requires a greater number of next line prefetch prediction confidence counters than, for example, providing a single, global next line prefetch prediction confidence counter assigned to the entire cache and used to predict a next line prefetch. However, employing fewer next line prefetch prediction confidence counters may result in reduced prediction accuracy for next line prefetches. Design and performance considerations can be used to determine the desired tradeoff between the number of next line prefetch prediction confidence counters and circuitry for accessing and updating the next line prefetch prediction confidence counters versus prediction accuracy.

In this regard in one aspect, a cache memory system is provided. The cache memory system comprises a lower level cache memory. The cache memory system also comprises a next line prefetch circuit. The next line prefetch circuit is configured to reset a prefetch prediction confidence state to a next line prefetch state in each of one or more next line prefetch prediction confidence indicators in a prefetch prediction confidence storage circuit, the one or more next line prefetch prediction confidence indicators each associated with one or more memory load instructions and configured to store a prefetch prediction confidence state indicating either a next line prefetch state or a no next line prefetch state. The next line prefetch circuit is also configured to receive a memory load instruction comprising a memory read address. The next line prefetch circuit is also configured to receive a cache hit/miss indicator indicating if read data for the memory read address of a memory is contained in the lower level cache memory. In response to the cache hit/miss indicator indicating the read data for the memory load instruction is not contained in the lower level cache memory, the next line prefetch circuit is also configured to access a prefetch prediction confidence state in a next line prefetch prediction confidence indicator of the one or more next line prefetch prediction confidence indicators associated with the memory load instruction in the prefetch prediction confidence storage circuit. In response to the accessed prefetch prediction confidence state indicating a next line prefetch state, the next line prefetch circuit is also configured to issue a next line prefetch request for a next prefetch memory read address from the memory read address to a higher level memory system to the lower level cache memory.

In another aspect, a cache memory system is provided. The cache memory system comprises means for storing lower level cache data. The cache memory system also comprises means for resetting a prefetch prediction confidence state to a next line prefetch state in each of one or more next line prefetch prediction confidence indicators in means for storing a next line prefetch prediction confidence indicator, the one or more next line prefetch prediction confidence indicators each associated with one or more memory load instructions and comprising means for storing the prefetch prediction confidence state indicating either a next line prefetch state or a no next line prefetch state. The cache memory system also comprises means for receiving a memory load instruction comprising a memory read address. The cache memory system also comprises means for receiving a cache hit/miss indicator indicating if read data for the memory read address of a memory is contained in the means for storing lower level cache data. The cache memory system also comprises means for accessing a prefetch prediction confidence state associated with the memory load instruction in the means for storing the next line prefetch prediction confidence indicator, in response to the cache hit/miss indicator indicating the read data for the memory load instruction is not contained in the means for storing lower level cache data. The cache memory system also comprises means for issuing a next line prefetch request for a next prefetch memory read address from the memory read address to a higher level memory system to the means for storing the lower level cache data in response to the accessed prefetch prediction confidence state indicating a next line prefetch state.

In another aspect, a method of throttling next line prefetches in a processor-based system is provided. The method comprises resetting a prefetch prediction confidence state to a next line prefetch state in each of one or more next line prefetch prediction confidence indicators in a prefetch prediction confidence storage circuit, the one or more next line prefetch prediction confidence indicators each associated with one or more memory load instructions and configured to store a prefetch prediction confidence state indicating either a next line prefetch state or a no next line prefetch state. The method also comprises receiving a memory load instruction comprising a memory read address. The method also comprises receiving a cache hit/miss indicator indicating if read data for a memory read address of a memory is contained in a lower level cache memory.

The method also comprises accessing a prefetch prediction confidence state in a next line prefetch prediction confidence indicator among the one or more next line prefetch prediction confidence indicators associated with the memory load instruction in the prefetch prediction confidence storage circuit, in response to the cache hit/miss indicator indicating the read data for the memory load instruction is not contained in the lower level cache memory. The method also comprises issuing a next line prefetch request for a next prefetch memory read address from the memory read address to a higher level memory system to the lower level cache memory, in response to the accessed prefetch prediction confidence state indicating a next line prefetch state.

In another aspect, a processor-based system is provided. The processor-based system comprises a lower level cache memory system. The lower level cache memory system comprises a lower level cache memory and a lower level next line prefetch circuit. The lower level next line prefetch circuit is configured to receive a memory load instruction comprising a memory read address. The lower level next line prefetch circuit is also configured to receive a cache hit/miss indicator indicating if read data for the memory read address of a memory is contained in the lower level cache memory. In response to the cache hit/miss indicator indicating the read data for the memory load instruction is not contained in the lower level cache memory, the lower level next line prefetch circuit is also configured to access a prefetch prediction confidence state in a next line prefetch prediction confidence indicator in a prefetch prediction confidence storage circuit, the next line prefetch prediction confidence indicator associated with the memory load instruction in the prefetch prediction confidence storage circuit. In response to the accessed prefetch prediction confidence state indicating a next line prefetch state, the lower level next line prefetch circuit is also configured to issue a next line prefetch request for a next prefetch memory read address from the memory read address to a higher level memory system to the lower level cache memory. The lower level next line prefetch circuit is also configured to receive a next line prefetch feedback indicator from the higher level memory system indicating if a next memory read address for a next memory load instruction received by the higher level memory system matched the next prefetch memory read address. In response to the next line prefetch feedback indicator indicating the next memory read address for the next memory load instruction matched the next prefetch memory read address, the lower level next line prefetch circuit is also configured to reset the prefetch prediction confidence state in the next line prefetch prediction confidence indicator associated with the memory load instruction to a next line prefetch state.

The processor-based system comprises a higher level memory system. The higher level memory system comprises a higher level cache memory and a higher level next line prefetch circuit. The higher level next line prefetch circuit is configured to receive the next line prefetch request for the next prefetch memory read address. The higher level next line prefetch circuit is also configured to receive a cache hit/miss indicator indicating if read data for the next prefetch memory read address is contained in the higher level cache memory. In response to the cache hit/miss indicator indicating the read data for the next prefetch memory read address is not contained in the higher level cache memory, the higher level next line prefetch circuit is also configured to request next read data at the next prefetch memory read address in the higher level memory system to the higher level cache memory, receive a next memory load instruction having a next memory read address, and determine if the next memory read address matches the next prefetch memory read address. In response to the next memory read address matching the next prefetch memory read address, the higher level next line prefetch circuit is also configured to store the next read data at the next prefetch memory read address from the higher level memory system in the higher level cache memory, and send the next line prefetch feedback indicator indicating the next memory read address for the next memory load instruction matched the next prefetch memory read address.

BRIEF DESCRIPTION OF THE FIGURES

FIGS. 9A and 9B illustrate other examples of updating the LPH register in FIG. 6 based on a hash with a program counter of a memory load instruction to be executed, wherein the LPH register is used by the next line prefetch circuit to access a next line prefetch prediction confidence indicator for controlling issuance of a next line prefetch request;

DETAILED DESCRIPTION

Figure 1:
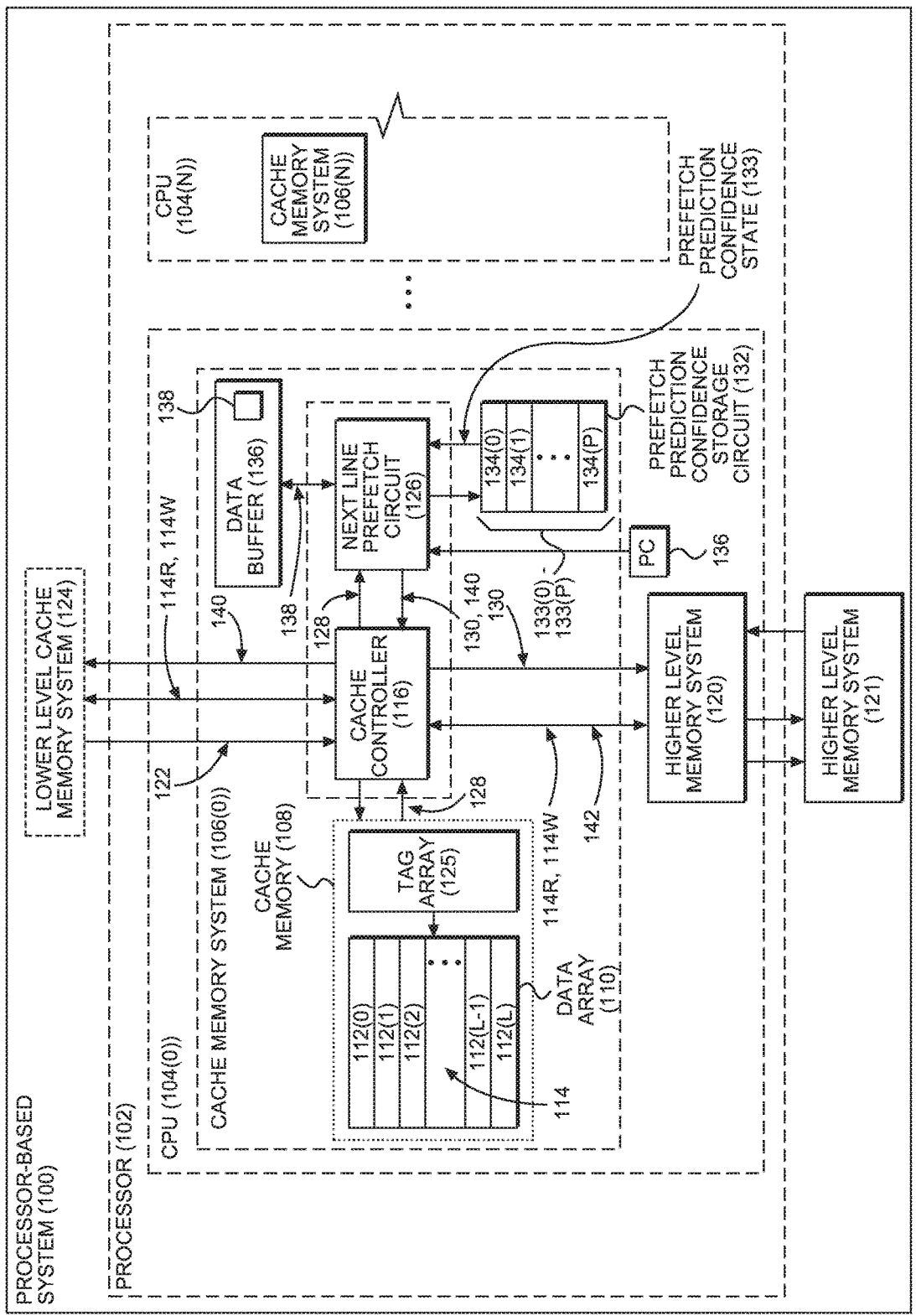
FIG. 1 is a schematic diagram of an exemplary processor-based system that includes a cache memory system and a next line prefetch circuit configured to throttle next line prefetching based on a prefetch prediction confidence state that is initially set to a high prefetch prediction confidence state to cause a next line to be prefetched.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

FIG. 1 is a schematic diagram of an exemplary processor-based system 100 that includes a processor 102. The processor 102 includes one or more central processing units (CPUs) 104(0)-104(N) (also known as "processor cores"), that are configured to execute software instructions. The processor 102 is considered a multi-CPU processor if the processor 102 includes more than one CPU 104. Each CPU 104(0)-104(N) includes a respective cache memory system 106(0)-106(N). As will be discussed in more detail below, the cache memory systems 106(0)-106(N) are configured to issue next line prefetch requests in response to cache misses for data access to cache memory in response to memory load instructions. The cache memory systems 106(0)-106(N) are configured to throttle next line prefetching based on a prefetch prediction confidence state that is initially set to a high prefetch prediction confidence state. In this manner, next line prefetching starts before first requiring correct predictions to be "built up." The workload performance of the CPUs 104(0)-104(N) may be increased as a result, because prefetching begins sooner rather than waiting for a number of correct predictions to occur. However, if the prefetch prediction confidence state lowers beyond a defined prefetch prediction confidence state as a result of mispredictions, the next line prefetching is throttled to cease prefetching.

Before discussing the next line prefetching in the cache memory systems 106(0)-106(N) employing an initial high prefetch prediction confidence state for throttling next line prefetches, other aspects of the cache memory systems 106(0)-106(N) are first discussed below. For simplicity purposes only, only the cache memory system 106(0) in the CPU 104(0) illustrated in FIG. 1 is discussed below. However, note that the details of the cache memory system 106(0) in the CPU 104(0) are also applicable to the cache memory systems 106(1)-106(N) in the respective CPUs 104(1)-104(N).

In this regard, with reference to FIG. 1 and using cache memory system 106(0) as an example, the cache memory system 106(0) includes a cache memory 108. The cache memory 108 includes a data array 110 that includes plurality of cache entries 112(0)-112(L) (also referred to as "cache lines 112(0)-112(L)") each configured to store cache data 114. A cache controller 116 is also provided in the cache memory system 106(0). The cache controller 116 is configured to receive a memory load instruction 122 directly or indirectly from the CPU 104(0). For example, the cache memory system 106(0) may be level zero (L0) cache that is directly accessed by the CPU 104(0). As another alternative example, the cache memory system 106(0) may be a level one (L1) cache that is indirectly accessed by the CPU 104(0) through a lower level cache memory system 124 acting as a level zero (L0) cache. The memory load instruction 122 includes a memory read address to be accessed to retrieve data for execution of the memory load instruction 122.

In response to receiving the memory load instruction 122, the cache controller 116 indexes a tag array 125 in the cache memory 108 using the memory read address in the memory load instruction 122. If the tag indexed by the memory read address of the memory load instruction 122 in the tag array 125 matches the memory read address in the memory load instruction 122, and the tag is valid, a cache hit occurs. This means that the cache data 112 corresponding to the memory read address of the memory load instruction 122 is contained in the cache entry 112(0)-112(N) associated with the indexed tag in the data array 110. In response, the cache controller 116 generates a cache hit/miss indicator 128 indicating a cache hit. The cache data 114 corresponding to the indexed tag is provided directly or indirectly as read cache data 114R to the CPU 104(0). If the tag indexed by the memory read address of the memory load instruction 122 in the tag array 125 does not match the memory read address in the memory load instruction 122 or if the tag is invalid, a cache miss occurs. In response, the cache controller 116 generates the cache hit/miss indicator 128 indicating a cache miss.

The cache controller 116 is also configured to fill write cache data 114W into the data array 110 as the cache data 114 in response to a memory write operation from the CPU 104(0). The write cache data 114W is stored in a cache entry 112(0)-112(L) in the data array 110 based on the memory read address of the memory write operation. In this manner, the CPU 104(0) can later access the cache data 114 stored in the data array 110 in response to the memory load instruction 122 as opposed to having to obtain the cache data 114 from a higher level memory, such as the higher level memory system 120. Thus, the cache memory 108 in this example is a lower level cache memory to the higher level memory system 120. Other memory systems, such as the higher level memory system 121, may also exist at a higher level to the higher level memory system 120. For example, the higher level memory system 121 may be another cache memory system or a main or system memory. The cache controller 116 is also configured to write back the write cache data 114W to the higher level memory system 120.

With continuing reference to FIG. 1, the cache memory system 106(0) includes a next line prefetch circuit 126. The next line prefetch circuit 126 is configured to issue next line prefetches in response to the memory load instructions 122 being processed by the CPU 104(0). The next line prefetch circuit 126 is configured to predict whether a next memory address following a memory read address of the memory load instruction 122 will be accessed in the near future for memory read operations. Using these predictions, the next line prefetch circuit 126 is configured to make next line prefetch requests to the higher level memory system 120 to speculatively preload cache lines 112(0)-112(L) at the next memory address(es) into the higher level memory system 120. Thus, data stored at the next memory address(es) is brought into the higher level memory system 120 before it is actually demanded. Thus, correct predictions of next memory addresses by the next line prefetch circuit 126 can reduce the number of cycles a load stalls in the CPU 104(0) waiting for data needed to execute the memory load instruction 122.

In this regard, the next line prefetch circuit 126 is configured to receive the memory load instruction 122 processed by the CPU 104(0). The memory load instruction 122 includes a memory read address to be accessed to retrieve data for execution of the memory load instruction 122. The cache controller 116 determines if valid data for the memory read address is stored in the cache memory 108 as read cache data 114R. The cache controller 116 generates the cache hit/miss indicator 128 indicating if the valid data for the memory read address is stored in the cache memory 108 as read cache data 114R. The next line prefetch circuit 126 is configured to receive the cache hit/miss indicator 128 from the cache controller 116 indicating if read cache data 114R for the memory read address of the memory load instruction 122 is contained in the cache memory 108. If the cache hit/miss indicator 128 indicates a cache hit, the next line prefetch circuit 126 does not issue a next line prefetch request in this example, because the next line prefetch request 130 would replace read cache data 114R in a cache entry 112(0)-112(L) in the cache memory 108 that may be more useful than the prefetched data. However, if the cache hit/miss indicator 128 indicates a cache miss, in this example, the next line prefetch circuit 126 is configured to issue a next line prefetch request 130. In this example, the next line prefetch request 130 is forwarded by the cache controller 116 to the higher level memory system 120 to prefetch the data at the next memory address(es).

In this example, the next line prefetch request 130 may be an instruction for the higher level memory system 120 to prefetch data for a next sequential memory address or line following the memory read address of the memory load instruction 122. Alternatively, the next line prefetch request 130 may also be an instruction for the higher level memory system 120 to prefetch data at another, next memory read address or addresses following the memory read address of the memory load instruction 122. However, the next line prefetch circuit 126 could be configured to issue the next line prefetch request 130 to the higher level memory system 120 without such request being provided to the cache controller 116. The higher level memory system 120 will process the next line prefetch request 130 as will be discussed in more detail below.

With continuing reference to FIG. 1, in this example, before the next line prefetch circuit 126 issues the next line prefetch request 130 in response to a cache miss for the memory load instruction 122, the next line prefetch circuit 126 is configured to predict the usefulness of the next line prefetch request 130. By usefulness, it is meant that there is a likelihood that prefetched data at the next memory address (es) will be accessed for a memory load operation sooner or more often that the evicted cache data 114 replaced with the next line prefetched data. If prefetched data at the next memory address(es) is not accessed in the near future for memory load operations, other cache data 114 in the cache memory 108 may be evicted and replaced that may have otherwise been accessed in response to the memory load operation.

In this regard, the next line prefetch circuit 126 in FIG. 1 is configured to access a prefetch prediction confidence storage circuit 132 to obtain a prefetch prediction confidence state 133 associated with the memory load instruction 122 for making a prefetch prediction. The prefetch prediction confidence storage circuit 132 contains one or more next line prefetch prediction confidence indicators 134(0)-134(P) that can be indexed based on the memory load instruction 122. For example, the prefetch prediction confidence storage circuit 132 may be indexed based on a portion of a program counter (PC) 136 of the memory load instruction 122. The next line prefetch prediction confidence indicators 134(0)-134(P) are each configured to store a prefetch prediction confidence state 133(0)-133(P) indicating either a next line prefetch state or a no next line prefetch state. The prefetch prediction confidence storage circuit 132 is indexed based on the memory load instruction 122 to access a next line prefetch prediction confidence indicator 134(0)-134(P). If the respective prefetch prediction confidence state 133(0)-133(P) of the indexed prefetch prediction confidence indicator 134(0)-134(P) is a next line prefetch state, the next line prefetch circuit 126 issues the next line prefetch request 130 in response to the cache miss. If the respective prefetch prediction confidence state 133(0)-133(P) of the indexed prefetch prediction confidence indicator 134(0)-134(P) is a no next line prefetch state, the next line prefetch circuit 126 does not issue the next line prefetch request 130 in response to the cache miss.

Figure 2:
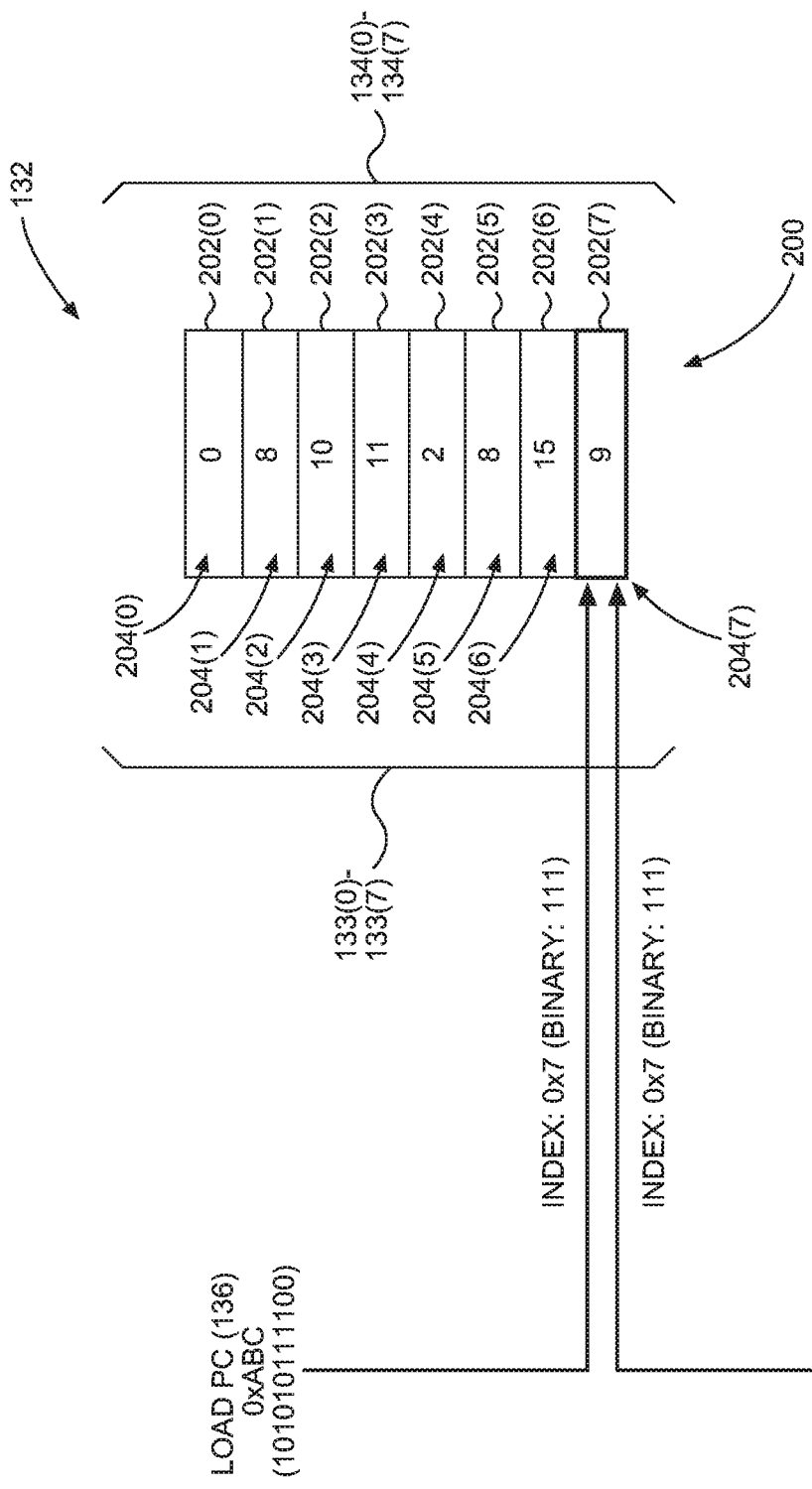
FIG. 2 illustrates an exemplary prefetch prediction confidence storage circuit (e.g., a table) configured to be accessed by the next line prefetch circuit in FIG. 1 to access one or more next line prefetch prediction confidence indicators in the form of one or more next line prefetch prediction confidence counters each indicating a prefetch prediction confidence state associated with a memory load instruction.

FIG. 2 illustrates one exemplary prefetch prediction confidence storage circuit 132 in the form of a prefetch prediction confidence table 200 that can be accessed and updated by the next line prefetch circuit 126 in FIG. 1 for making next line prefetch predictions. As shown therein, the prefetch prediction confidence table 200 includes next line prefetch prediction confidence indicators 134(0)-134(7) provided in the form of next line prefetch prediction confidence counters 202(0)-202(7). In this example, eight (8) next line prefetch prediction confidence indicators 134(0)-134(7) are provided. The next line prefetch prediction confidence indicators 134(0)-134(7) are configured to store eight (8) respective prefetch prediction confidence states 133(0)-133(7) in the form of prefetch prediction confidence counts 204(0)-204(7). The count value of the prefetch prediction confidence counts 204(0)-204(7) is indicative of prediction confidences predicting the usefulness of next line prefetches. In this example, a prefetch prediction confidence count 204 of zero (0) represents the highest prediction confidence.

In this example, each next line prefetch prediction confidence counter 202(0)-202(7) is initialized to zero (0) so that the next line prefetch circuit 126 to be in a next line prefetch state issues next line prefetch requests 130 in response to cache misses for memory load instructions 122. As will be discussed in more detail below, as a misprediction occurs, the next line prefetch circuit 126 is configured to increment the next line prefetch prediction confidence counters 202(0)-202(7) associated or indexed by the memory load instructions 122 in response to a next line prefetch misprediction. Once a prefetch prediction confidence count 204(0)-204(7) reaches a defined prefetch prediction count value, such prefetch prediction confidence count 204(0)-204(7) will be deemed to be in a no next line prefetch state. In this example, the defined prefetch prediction count value for a no next line prefetch state is when the next line prefetch prediction confidence counter 202(0)-202(7) saturates. For example, if the next line prefetch prediction confidence counters 202(0)-202(7) are four (4)-bit counters, saturation occurs at binary count 0x1111.

Also as shown in FIG. 2, the prefetch prediction confidence table 200 is configured to be indexed to associate a particular next line prefetch prediction confidence counter 202(0)-202(7) with a particular memory load instruction 122. In this example, the prefetch prediction confidence table 200 is indexed by the next line prefetch circuit 126 based on the PC 136 of the memory load instruction 122. This allows a distribution of next line prefetch prediction confidence counters 202(0)-202(7) over different PCs for a different memory load instruction 122 as a way to provide some history between a memory load instruction 122 and a next line prefetch prediction confidence counter 202(0)-202(7) for predicting next line prefetching. As shown in one example in FIG. 2, if the PC 136 of a memory load instruction 122 is 0xABC (i.e., 0x101010111100), the next line prefetch circuit 126 may be configured to take least significant bits 3, 4, and 5 (i.e., 0x111) to use to index a next line prefetch prediction confidence counter 202(0)-202(7) in the prefetch prediction confidence table 200 to use to predict a next line prefetch. The number of bits taken from the PC 136 may be based on the size of the prefetch prediction confidence table 200. For example, in this example, the prefetch prediction confidence table 200 has eight (8) next line prefetch prediction confidence counters 202(0)-202(7) which can be fully indexed with three (3) bits. Other indexing arrangements are also possible.

Also note that in the example in FIG. 2, another PC 136 of 0xD1C (i.e., 0x110100011100) provides the same index of 0x111 in this example. In other words, in this example, the next line prefetch prediction confidence counters 202(0)-202(7) are shared and accessed for different PCs 136 to avoid providing next line prefetch prediction confidence counters 202(0)-202(7) for every unique PC 136, although such is possible.

The next line prefetch circuit 126 may have an advantage over other types of prefetching circuits by not requiring memory structures to store previously accessed addresses for tracking memory address patterns, thus requiring less area and power consumption. However, to mitigate prefetch mispredictions by the next line prefetch circuit 126 that can increase cache pollution in the cache memory system 106(0), the next line prefetch circuit 126 in FIG. 1 is configured to be throttled to cease prefetching after the respective prefetch prediction confidence state 133(0)-133(P) of the next line prefetch confidence indicator 134(0)-134(P) associated with the received memory load instruction 122 is a no next line prefetch state. The next line prefetch circuit 126 is configured to be unthrottled to allow next line prefetching after the respective prefetch prediction confidence state 133(0)-133(P) of the next line prefetch confidence indicator 134(0)-134(P) associated with the received memory load instruction 122 becomes a next line prefetch state. In this regard, instead of the next line prefetch circuit 126 being assigned an initial no prefetch prediction confidence state 133(0)-133(P) which is "built up" (e.g., in a next line prefetch prediction confidence counter) in response to correct predictions to eventually change to a prefetch prediction confidence state 133(0)-133(P) to predict next line prefetches, the next line prefetch circuit 126 is assigned an initial next line prefetch state. Thus, the next line prefetch circuit 126 starts issuing next line prefetch requests 130 in response to the memory load instruction 122 before first requiring correct predictions to be "built up" for data requests for memory load instructions 122. CPU 104(0) workload performance may be increased as a result, because prefetching begins sooner rather than waiting for a number of correct predictions to occur. Once the prefetch prediction confidence state 133(0)-133(P) becomes a no next line prefetch state as a result of mispredictions, the next line prefetch circuit 126 is throttled to cease prefetching. Next line prefetching by the next line prefetch circuit 126 is again unthrottled once the respective prefetch prediction confidence state 133(0)-133(P) in a next line prefetch prediction confidence indicator 134(0)-134(P) once again changes to a next line prefetch state based on a correct prediction(s).

In this example, to cause the next line prefetch circuit 126 to initially predict next line prefetches for received memory load instructions 122, the prefetch prediction confidence states 133(0)-133(P) of the next line prefetch prediction confidence indicators 134(1)-134(P) in the prefetch prediction confidence storage circuit 132 is initially set to a next line prefetch state. In this manner, the next line prefetch circuit 126 starts issuing next line prefetch requests 130 in response to the memory load instruction 122 before first requiring correct predictions to be "built up" for data requests for the memory load instructions 122. For example, the prefetch prediction confidence states 133(0)-133(P) of the next line prefetch prediction confidence indicators 134(1)-134(P) may be reset to the next line prefetch state in response to a power cycle of the CPU 104(0). In another example, the prefetch prediction confidence state 133(0)-133(P) of the next line prefetch prediction confidence indicators 134(1)-134(P) may be set or reset to the next line prefetch state periodically to remove stale prefetch state information from being accumulated based on previous CPU 104(0) workloads.

The cache memory system 106(0) in FIG. 1 has thus far been described as issuing next line prefetch requests 130. However, if another lower level cache memory system, such as the lower level cache memory system 124 in FIG. 1, is provided between the CPU 104(0) and the cache memory system 106(0) acting as a higher level cache memory system, the cache memory system 106(0) may also be configured to receive next line prefetch requests for performing next line prefetches into the cache memory 108. In this regard, the next line prefetch circuit 126 may be configured to perform next line prefetches in response to a received next line prefetch request 130 from the lower level cache memory system 124. In this example, the lower level cache memory system 124 would contain a next line prefetch circuit 126 and the same or similar supporting components described above for predicting next line prefetches and issuing next line prefetch requests 130 in response. A data buffer 136 can be provided in the cache memory system 106(0) to allow next line prefetched data 138 prefetched by the next line prefetch circuit 126 to be temporarily stored until it can be determined whether the next line prefetched data 138 is useful. This information can be provided in a next line prefetch feedback indicator 140 to the lower level cache memory system 124 to be used to update the prefetch prediction confidence state 133(0)-133(P) in a next line prefetch confidence indicator 134(0)-134(P). Likewise, the next line prefetch circuit 126 can receive a next line prefetch feedback indicator 142 from the higher level memory system 120 to allow the next line prefetch circuit 126 to update the respective prefetch prediction confidence state 133(0)-133(P) in a next line prefetch confidence indicator 134(0)-134(P) associated with the memory load instruction 122 in response to next line prefetch requests 130 issued by the next line prefetch circuit 126 to the higher level memory system 120.

Figure 3:
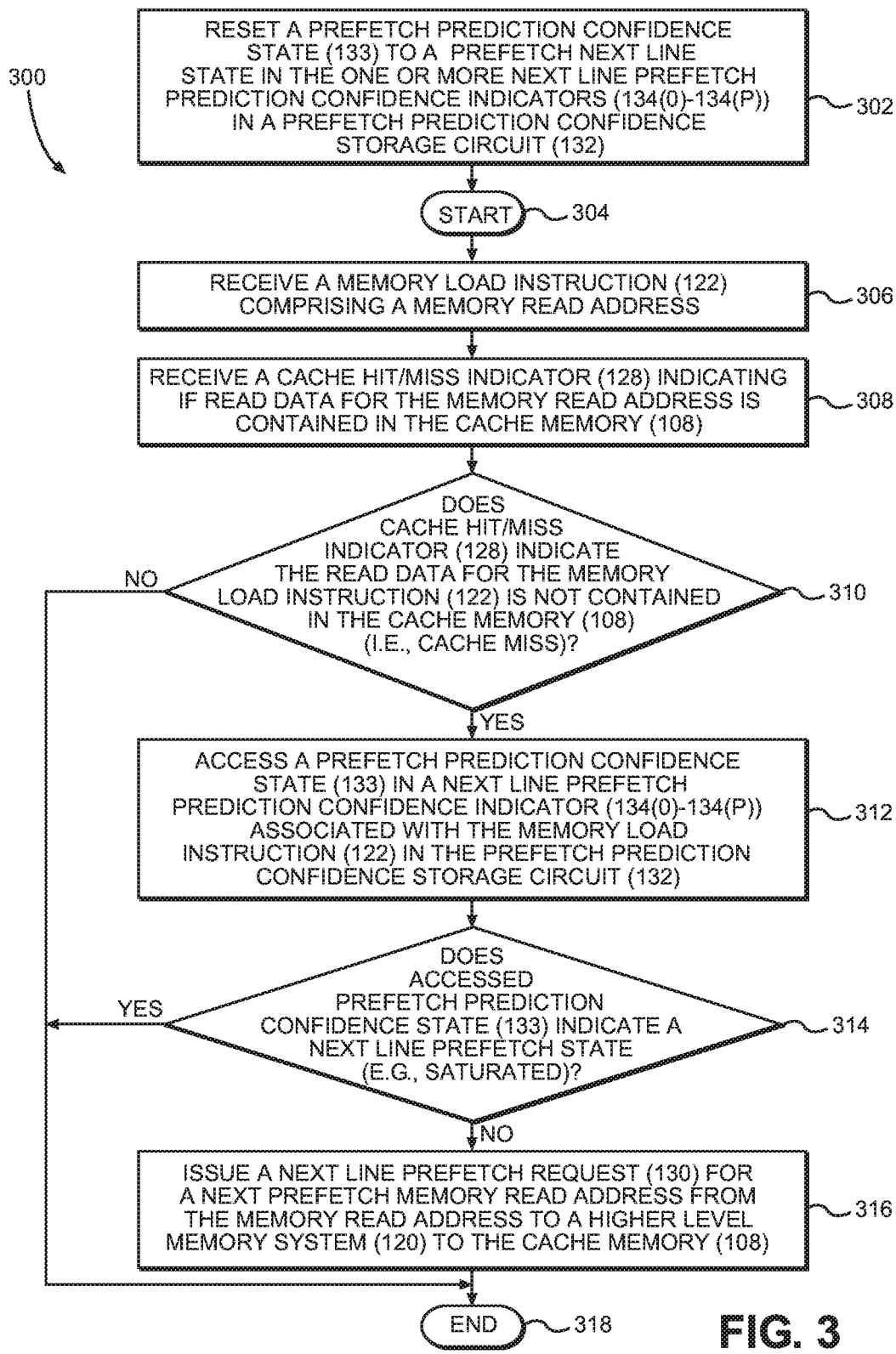
FIG. 3 is a flowchart illustrating an exemplary process of the next line prefetch circuit in FIG. 1 throttling next line prefetching of data into a higher level memory based on a next line prefetch prediction confidence indicator that is initially set to a high prefetch prediction confidence state to cause a next line to be prefetched.
Figure 4:
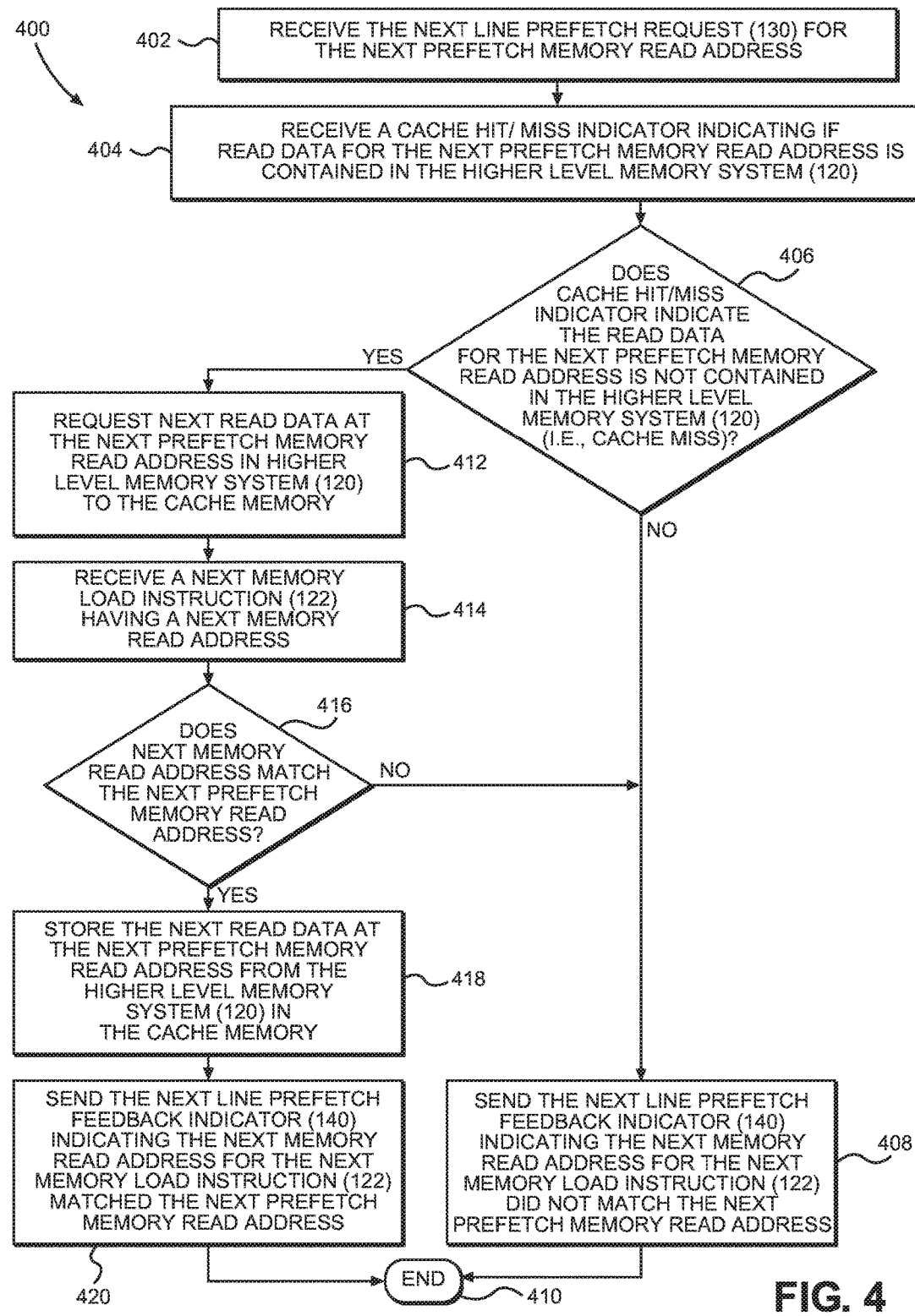
FIG. 4 is a flowchart illustrating an exemplary process of a higher level memory in FIG. 1 receiving a next line prefetch request from a lower level memory, and providing a next line prefetch feedback indicator to the next line prefetch circuit to be used to update a prediction confidence level indicator(s)
Figure 5:
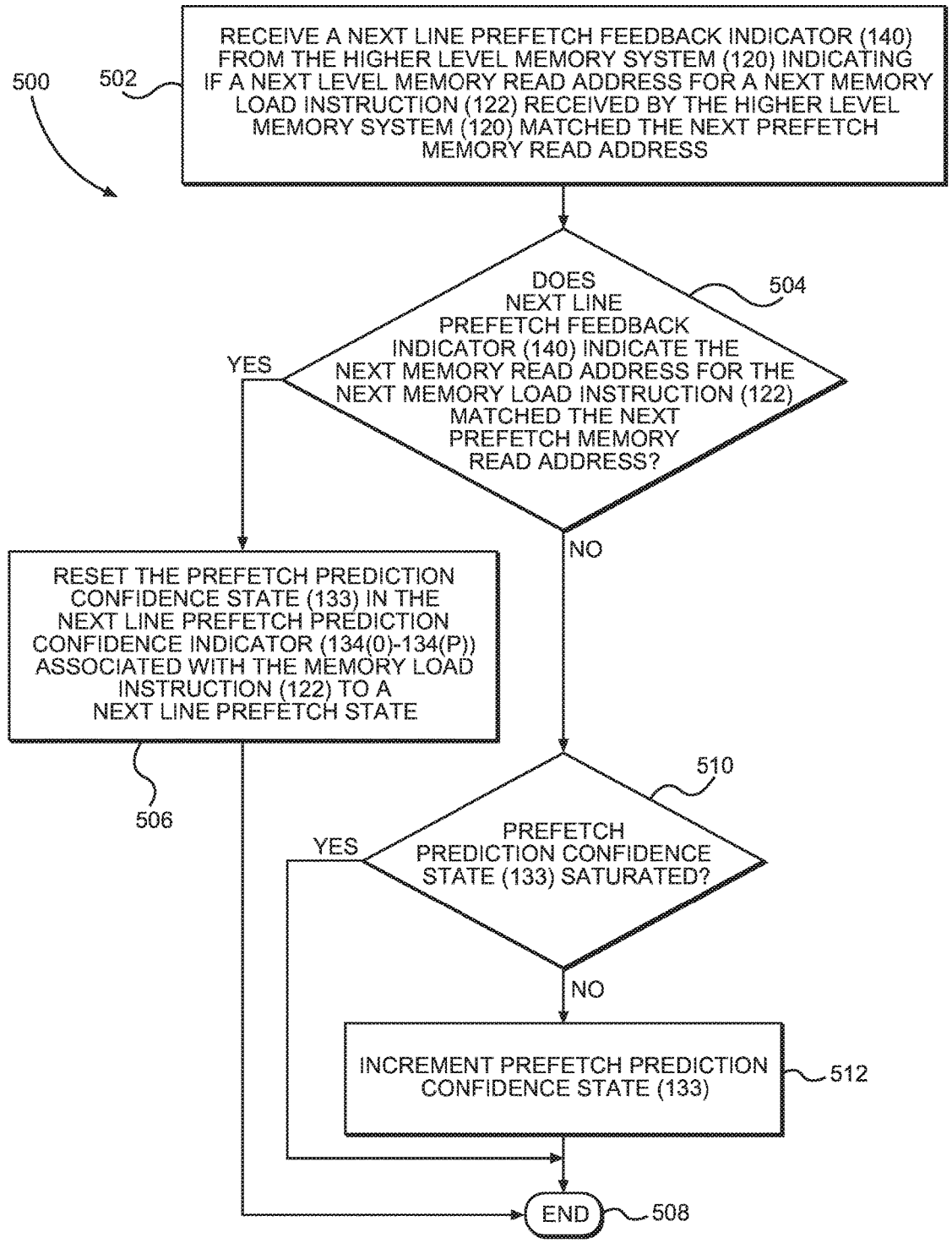
FIG. 5 is a flowchart illustrating an exemplary process of the next line prefetch circuit in FIG. 1 updating a next line prefetch prediction confidence indicator(s) based on whether the prefetched next line into the higher level memory matched the next accessed line in the higher level memory.

Now that the cache memory system 106(0) and its next line prefetch circuit 126 and related components in the exemplary processor-based system 100 in FIG. 1 have been introduced and discussed, exemplary processing in the cache memory system 106(0) is now discussed in reference to the flowcharts in FIGS. 3-5.

FIG. 3 discussed below is a flowchart illustrating an exemplary process 300 of the next line prefetch circuit 126 in FIG. 1 accessing the prefetch prediction confidence storage circuit 132 for making next line predictions for memory load instructions 122 and to determine the throttling of next line prefetch requests 130 issued to the higher level memory system 120. FIG. 4 discussed below is a flowchart illustrating an exemplary process 400 of the higher level memory system 120 in FIG. 1 receiving the next line prefetch request 130 from the cache memory system 106(0) and providing a next line prefetch feedback indicator 142 to the next line prefetch circuit 126 used by the next line prefetch circuit 126 to update a prediction confidence level indicator(s) 134(0)-134(P) in the prefetch prediction confidence storage circuit 132. FIG. 5 is a flowchart illustrating an exemplary process 500 of the next line prefetch circuit 126 in FIG. 1 updating a next line prefetch prediction confidence indicator 134(0)-134(P) in the prefetch prediction confidence storage circuit 132 based on a next line prefetch feedback indicator 142 from the higher level memory system 120 as to the usefulness of the next line prefetch carried out in response to receiving a next line prefetch request 130 from the cache memory system 106(0).

With reference to the process 300 in FIG. 3, the next line prefetch circuit 126 in FIG. 1 may have previously reset the prefetch prediction confidence states 133 of the next line prefetch prediction confidence indicators 134(0)-134(P) in the prefetch prediction confidence storage circuit 132 to an initial next line prefetch state as previously discussed (block 302). In response to a memory load instruction 122 being received in the cache memory system 106(0), the process 300 of the next line prefetch circuit 126 predicting a next line prefetch starts (block 304). The next line prefetch circuit 126 receives a memory load instruction 122 comprising a memory read address (block 306). The next line prefetch circuit 126 also receives the cache hit/miss indicator 128 indicating if read data for the memory read address is contained in the cache memory 108. The next line prefetch circuit 126 determines if the access to the cache memory 108 results in a cache hit or cache miss (block 308). In response to the cache hit/miss indicator 128 indicating the read data for the memory load instruction 122 is not contained in the cache memory 108, meaning a cache miss (block 310), the next line prefetch circuit 126 accesses a prefetch prediction confidence state 133 in the next line prefetch prediction confidence indicator 134(0)-134(P) associated with the memory load instruction 122 in the prefetch prediction confidence storage circuit 132 (block 312). The next line prefetch circuit 126 then determines if the accessed prefetch prediction confidence state 133 for the memory load instruction 122 indicates a next line prefetch state to make a next line prefetch prediction (block 314). For example, if the prefetch prediction confidence state 133 is prefetch prediction confidence count 204, the next line prefetch state may exist if the prefetch prediction confidence count 204 is not saturated as discussed above. If the prefetch prediction confidence state 133 is a next line prefetch state as the next line prefetch prediction, the next line prefetch circuit 126 issues a next line prefetch request 130 for a next prefetch memory read address from the memory read address of the memory load instruction 122 to the higher level memory system 120 (block 316), and the process 300 ends (block 318). If however, the prefetch prediction confidence state 133 is a no next line prefetch state as the next line prefetch prediction, the process 300 ends (block 318) without the next line prefetch circuit 126 issuing the next line prefetch request 130. Further, in block 310, if cache hit/miss indicator 128 indicates that the read data for the memory load instruction 122 is contained in the cache memory 108, meaning a cache hit, the process 300 ends (block 318) without the next line prefetch circuit 126 issuing the next line prefetch request 130.

With reference to FIG. 4, when the next line prefetch circuit 126 issues the next line prefetch request 130 to the higher level memory system 120 in response to a memory load instruction 122 associated with next line prefetch state prediction, the higher level memory system 120 is configured to conduct the exemplary process 400 in FIG. 4. Further, the process 400 in FIG. 4 can also be carried out by the cache memory system 106(0) and/or the next line prefetch circuit 126 in response to a next line prefetch request 130 made by the lower level cache memory system 124 in FIG. 1, as discussed above.

With reference to FIG. 4, the process 400 begins with the higher level memory system 120 receiving the next line prefetch request 130 for the next prefetch memory read address from the cache memory system 106(0) (block 402). For example, this received next line prefetch request 130 is issued as a result of the process 300 in block 316 in FIG. 3. The higher level memory system 120 also receives its own cache hit/miss indicator indicating if read data for the next prefetch memory read address is contained in the higher level memory system 120 (block 404). The higher level memory system 120 determines if the received cache hit/miss indicator indicates the read data for the next prefetch memory read address is not contained in the higher level memory system 120 (i.e., a cache hit) (block 406). If the result of the determination is no, the higher level memory system 120 sends the next line prefetch feedback indicator 140 indicating that the next memory read address for the next memory load instruction processed by the higher level memory system 120 did not match the next prefetch memory read address (block 408), and the process 400 ends (block 410). In other words, the next line prefetch request 130 issued by the next line prefetch circuit 126 was deemed not useful.

However, if the higher level memory system 120 determines if the received cache hit/miss indicator indicates the read data for the next prefetch memory read address is not contained in the higher level memory system 120 (i.e., a cache miss) (block 406), the higher level memory system 120 requests a next read data at the next prefetch read address in the higher level memory system 120 (block 412). The higher level memory system 120 then receives a next memory load instruction 122 have a next memory read address to be processed (block 414). The higher level memory system 120 determines if the next read address of the next memory load instruction 122 matches the next prefetch memory read address resulting from the received next line prefetch request 130 (block 416). If not, the higher level memory system 120 sends the next line prefetch feedback indicator 140 indicating that the next memory read address for the next memory load instruction 122 processed by the higher level memory system 120 did not match the next prefetch memory read address (block 408), and the process 400 ends (block 410). In other words, the next line prefetch request 130 issued by the next line prefetch circuit 126 was deemed not useful. If however, the higher level memory system 120 determines that next read address of the next memory load instruction 122 matches the prefetch memory read address resulting from the received next line prefetch request 130 in block 416, the higher level memory system 120 stores the next read data at the next prefetch memory read address in the cache memory 108 of the higher level memory system 120 (block 418). The higher level memory system 120 then sends the next line prefetch feedback indicator 140 indicating that the next memory read address for the next memory load instruction 122 processed by the higher level memory system 120 matched the next prefetch memory read address (block 420), and the process 400 ends (block 410). In this case, the next line prefetch request 130 issued by the next line prefetch circuit 126 was deemed useful.

FIG. 5 illustrates the exemplary process 500 performed by the next line prefetch circuit 126 in FIG. 1 after receiving the next line prefetch feedback indicator 140 from the higher level memory system 120 in FIG. 4. In this regard, the next line prefetch circuit 126 receive the next line prefetch feedback indicator 140 from the higher level memory system 120 indicating if a next memory read address for a next memory load instruction received by the higher level memory system 120 matched the next prefetch memory read address (block 502). The next line prefetch circuit 126 determines if the next line prefetch feedback indicator 140 indicates that the next memory read address for the next memory load instruction 122 matched the next prefetch memory read address (block 504). If so, the next line prefetch circuit 126 resets the prefetch prediction confidence state 133 in the next line prefetch prediction confidence indicator 134(0)-134(P) associated with the memory load instruction 122 to a next line prefetch state, that caused the next line prefetch request 130 to be issued to the higher level memory system 120 (block 506), and the process 500 ends (block 508). If however, the next line prefetch circuit 126 determines if the next line prefetch feedback indicator 140 indicates that the next memory read address for the next memory load instruction 122 did not match the next prefetch memory read address (block 504), this means that the next line prefetch request 130 is deemed not useful. The next line prefetch circuit 126 determines if the prefetch prediction confidence state 133 is saturated (block 510). If not, the prefetch prediction confidence state 133 is incremented (block 512) to track the misprediction so that the prefetch prediction confidence state 133 is updated to be used by the next line prefetch circuit 126 for a future memory load instruction 122 that is associated with the prefetch prediction confidence state 133, and the process 500 ends (block 508).

Figure 6:
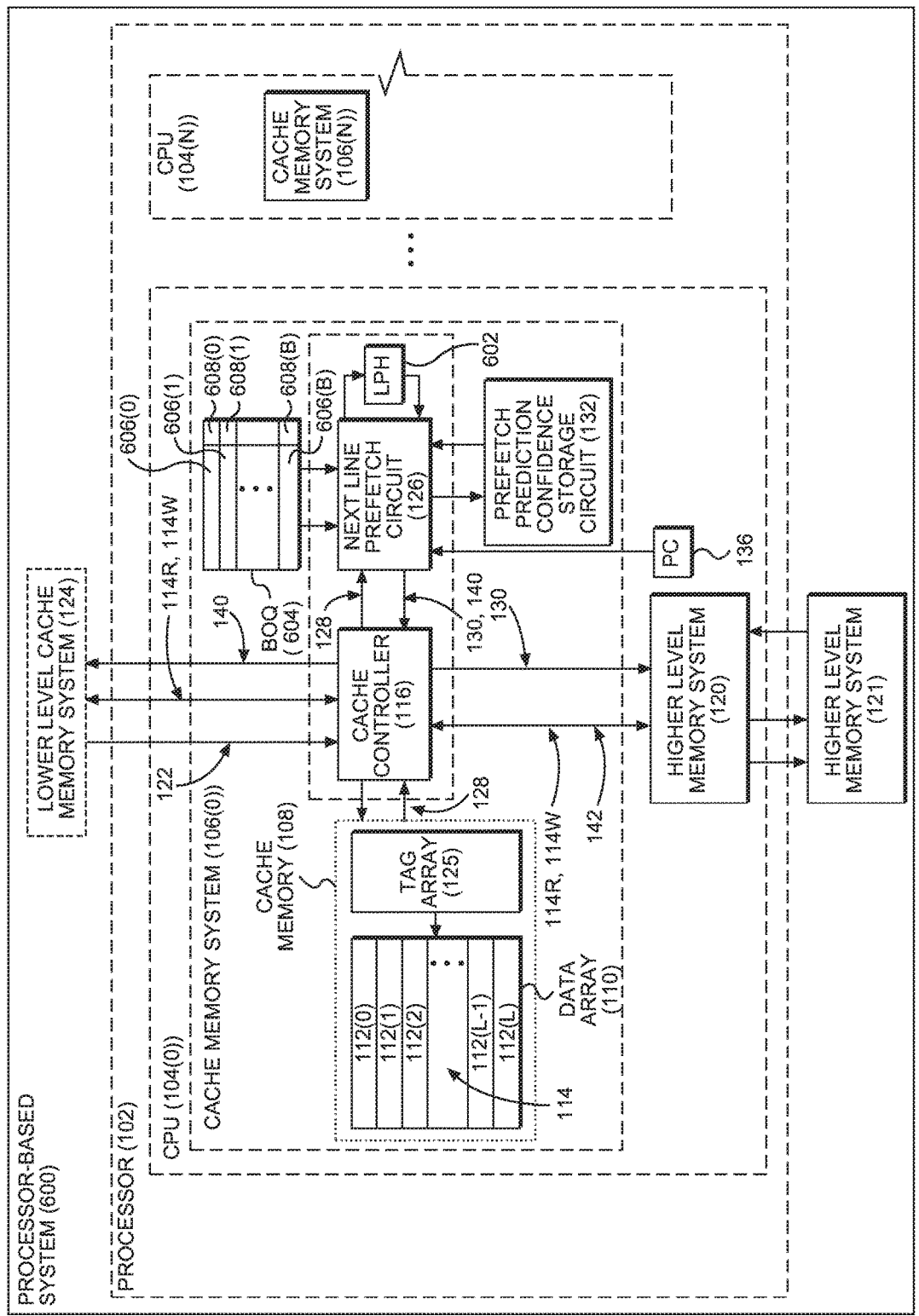
FIG. 6 is a schematic diagram of another exemplary processor-based system that includes a cache memory system and a next line prefetch circuit configured to throttle next line prefetching based on a prefetch prediction confidence state that is initially set to a high prefetch prediction confidence state to cause a next line to be prefetched, and receive next line prefetch requests from a lower level memory system.

FIG. 6 is a schematic diagram of another exemplary processor-based system 600 that is similar to the processor-based system 100 in FIG. 1. Similar components between the processor-based system 600 in FIG. 6 and the processor-based system 100 in FIG. 1 are illustrated with common element numbers, and thus are not re-described. However, in the processor-based system 600 in FIG. 6, additional optional features are provided. For example, a load path history (LPH) register 602 is provided that allows a previous hashed value, such as the PC 136, to be stored and used to access the prefetch prediction confidence storage circuit 132 during a next evaluation of a memory load instruction 122 by the next line prefetch circuit 126. Further, a bank operation queue (BOQ) 604 is shown that includes a plurality of BOQ entries 606(1)-606(B) used as data buffers to storing prefetched data for installation in the cache memory 108 according to a process similar to the process 400 in FIG. 4 when the cache memory system 106(0) is acting as a higher level cache memory system to respond to next line prefetch requests 130 from the lower level cache memory system 124. A valid indicator 608(0)-608(B) is provided in the BOQ 604 for each BOQ entry 606(1)-606(B) to indicate the validity of the respective BOQ entry 606(1)-606(B). In this regard, FIG. 7 illustrates an exemplary process 700 of the higher level memory system 120 in FIG. 6 receiving the next line prefetch request 130 from the cache memory system 106(0) and using the BOQ 604 to store and match prefetched data for providing the next line prefetch feedback indicator 142 to the next line prefetch circuit 126 to update a prediction confidence level indicator(s) 134(0)-134(P) in the prefetch prediction confidence storage circuit 132.

Figure 7:
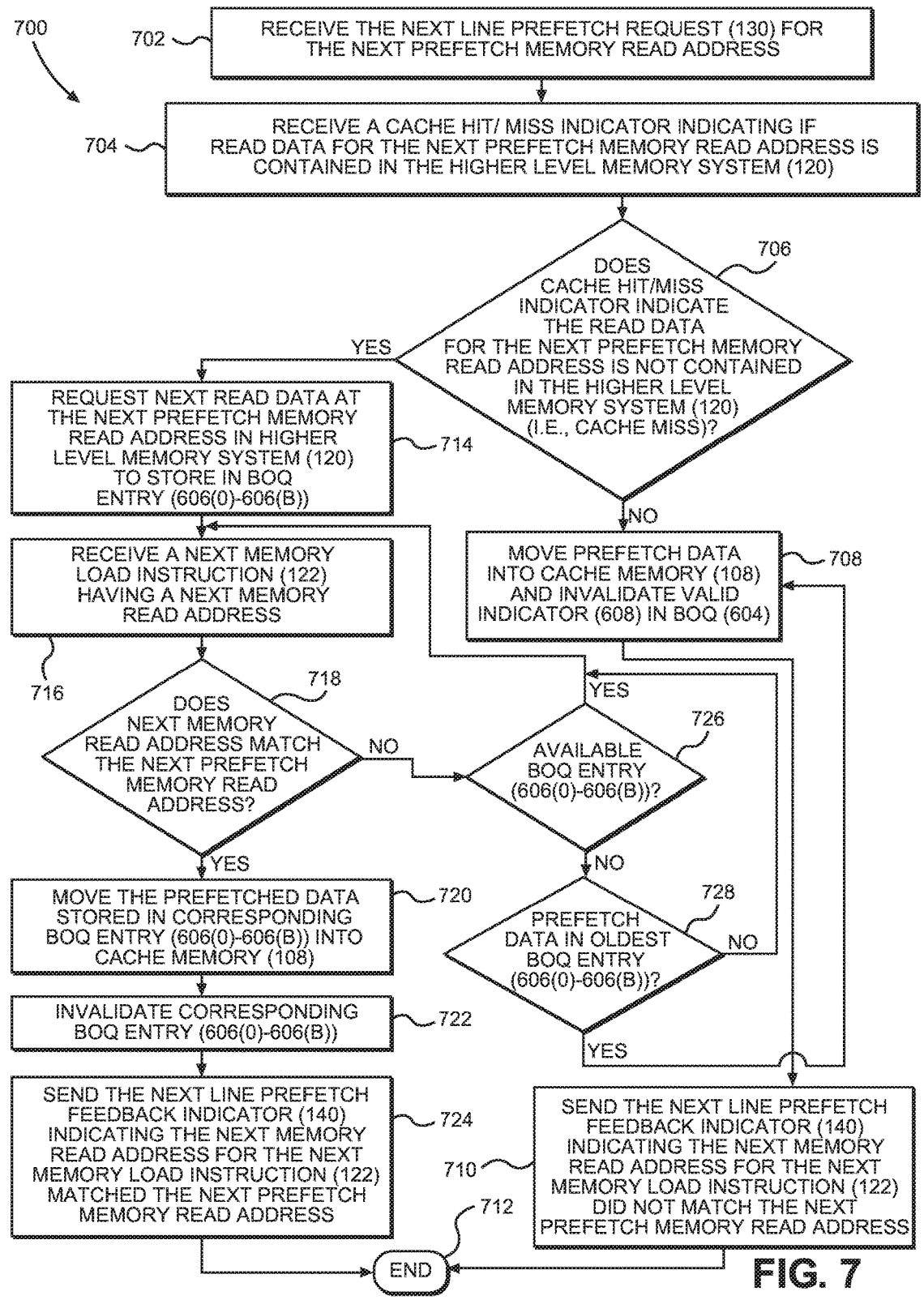
FIG. 7 a flowchart illustrating an exemplary process of the next line prefetch circuit in FIG. 6 receiving a next line prefetch request from a lower level memory and storing prefetched data from the next line in a bank operation queue (BOQ) for installation in the cache if the next accessed line matches the prefetched line.

In this regard, as shown in FIG. 7, when the next line prefetch circuit 126 issues the next line prefetch request 130 to the higher level memory system 120 in response to a memory load instruction 122 associated with next line prefetch state prediction, the higher level memory system 120 is configured to conduct the exemplary process 700 in FIG. 7. The process 700 begins with the higher level memory system 120 receiving the next line prefetch request 130 for the next prefetch memory read address from the cache memory system 106(0) (block 702). For example, this received next line prefetch request 130 is issued as a result of the process 300 in block 316 in FIG. 3. The higher level memory system 120 also receives its own cache hit/miss indicator indicating if read data for the next prefetch memory read address is contained in the higher level memory system 120 (block 704). The higher level memory system 120 determines if the received cache hit/miss indicator indicates the read data for the next prefetch memory read address is not contained in the higher level memory system 120 (i.e., a cache hit) (block 706). If the result of the determination is no, the higher level memory system 120 moves the prefetched data into its cache memory 108 and invalidates a valid indicator 608(0)-608(B) corresponding the memory load instruction 122 in the BOQ 604 (block 708). The higher level memory system 120 sends the next line prefetch feedback indicator 140 indicating that the next memory read address for the next memory load instruction 122 processed by the higher level memory system 120 did not match the next prefetch memory read address (block 710), and the process 700 ends (block 712). In other words, the next line prefetch request 130 issued by the next line prefetch circuit 126 was deemed not useful.

However, if the higher level memory system 120 determines if the received cache hit/miss indicator indicates the read data for the next prefetch memory read address is contained in the higher level memory system 120 (i.e., a cache miss) (block 706), the higher level memory system 120 requests a next read data at the next prefetch read address in the higher level memory system 120 in an available BOQ entry 606(0)-606(B) (block 714). The higher level memory system 120 then receives a next memory load instruction 122 have a next memory read address to be processed (block 716). The higher level memory system 120 determines if the next memory read address of the next memory load instruction 122 matches the prefetch memory read address resulting from the received next line prefetch request 130 (block 718). If so, the higher level memory system 120 moves the prefetched data stored in a corresponding BOQ entry 606(0)-606(B) into the cache memory 108 (block 720), invalidates the corresponding BOQ entry 606(0)-606(B) (block 722), and sends the next line prefetch feedback indicator 140 indicating that the next memory read address for the next memory load instruction 122 processed by the higher level memory system 120 matches the next prefetch memory read address (block 724), and the process 700 ends (block 712). In other words, the next line prefetch request 130 issued by the next line prefetch circuit 126 was deemed useful.

With continuing reference to FIG. 7, if however, the higher level memory system 120 determined that the next read address of the next memory load instruction 122 did not match the next prefetch memory read address resulting from the received next line prefetch request 130 in block 718, the next line prefetch request 130 issued by the next line prefetch circuit 126 may have not been useful. In this regard, the higher level memory system 120 determines if there is an available BOQ entry 606(0)-606(B) in the BOQ 604 (block 726). If the higher level memory system 120 determines that there is an available BOQ entry 606(0)-606(B) in the BOQ 604, the process 700 returns to receive a next memory load instruction 122 to a next memory read address to be processed in block 716 without yet deeming the next line prefetch request 130 issued by the next line prefetch circuit 126 as being not useful. This is because the next line prefetch request 130 issued by the next line prefetch circuit 126 is not consuming a BOQ entry 606(0)-606(B) that would prevent other next line prefetch requests 130 from being stored in the BOQ 604. Thus, the next line prefetch request 130 issued by the next line prefetch circuit 126 does not yet have to be deemed not useful in case subsequent next memory read addresses for next memory load instructions 122 match the next prefetch memory read address resulting from the received next line prefetch request 130.

With continuing reference to FIG. 7, if in block 726, it is determined there is not an available BOQ entry 606(0)-606(B) in the BOQ 604, this means that the next line prefetch request 130 is consuming a BOQ entry 606(0)-606(B) that may otherwise be used for another next line prefetch request 130. In this case, the higher level memory system 120 determines if prefetched data for the prefetched memory address is stored in an oldest BOQ entry 606(0)-606(B) (block 728). If not, the BOQ entry 606(0)-606(B) for next read data at the next prefetch read address is not freed in the BOQ 604, and the process 700 returns to block 716. Again, the next line prefetch request 130 issued by the next line prefetch circuit 126 is not yet deemed not useful. If however, the higher level memory system 120 determines that the prefetched data for the prefetched memory address is stored in an oldest BOQ entry 606(0)-606(B) in the BOQ 604, the process 700 continues to block 708 discussed above to invalidate the BOQ entry 606(0)-606(B) and make it available for storing future prefetched data for installation in the cache memory 108. The next line prefetch request 130 issued by the next line prefetch circuit 126 is now deemed not useful, because its next memory read address did not match the next prefetch memory read address resulting from the received next line prefetch request 130, and is not retained to determine if it matches a memory read address for a subsequent next memory load instruction.

Figure 8:
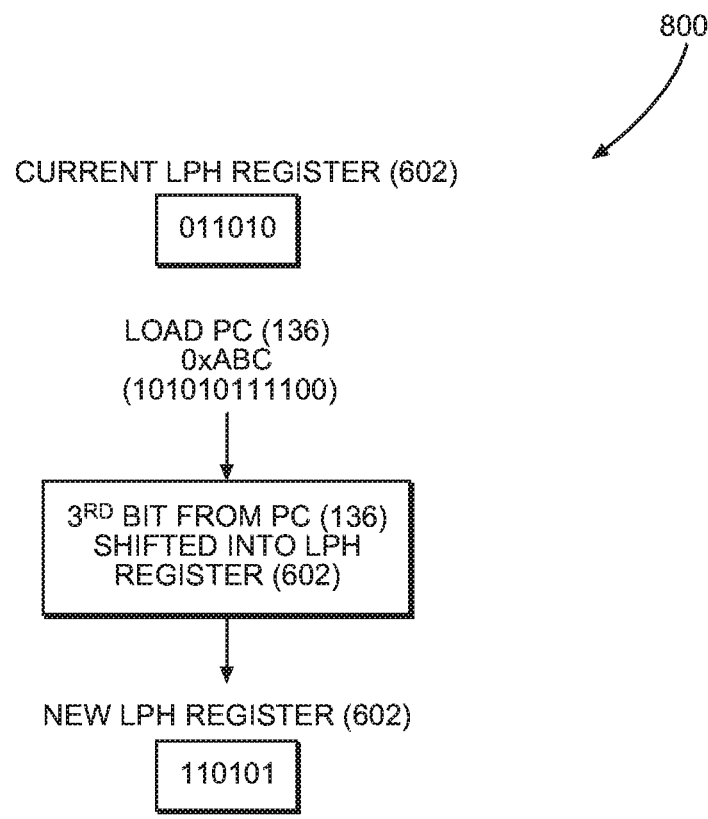
FIG. 8 illustrates an example of a load path history (LPH) register provided in a cache memory system in FIG. 6, wherein the LPH register is updated to be used by the next line prefetch circuit to access a next line prefetch prediction confidence indicator associated with a memory load instruction for controlling issuance of a next line prefetch request.

FIG. 8 illustrates an example 800 of using the LPH register 602 provided in the cache memory system 106(0) in FIG. 6 to access a next line prefetch prediction confidence indicator 134(0)-134(P) associated with a memory load instruction 122 for controlling issuance of a next line prefetch request 130. Use of a LPH provides unique context for predicting next line prefetching. This history is provided as a function of the shifting one or more designated bits of PC 136 for the memory load instruction 122 into a prior LPH value stored in the LPH register 602. In this regard, an example of a current LPH value of the LPH register 602 may be 0x011010 as shown in FIG. 8. The PC 136 may be 0x101010111100. After the designated $3^{rd}$ bit in this example in the PC 136 is shifted into the LPH register 602, the new LPH value of the LPH register 602 is 0x110101. The new LPH value in the LPH register 602 can be used to index a next line prefetch prediction confidence indicator 134(0)-134(P) in the prefetch prediction confidence storage circuit 132 to perform a next line prefetch prediction.

Other methods can also be employed to update the LPH register 602 to be used to index a next line prefetch prediction confidence indicator 134(0)-134(P) in the prefetch prediction confidence storage circuit 132 for performing a next line prefetch prediction. In this regard, FIGS. 9A and 9B provide two other examples of updating the LPH register 602 in FIG. 6 based on a hash with the PC 136 of a memory load instruction 122 to form a hashed LPH value. In an example 900 in FIG. 9A, the same current LPH value of the LPH register 602 in FIG. 8 is bitwise exclusively OR'ed with the same value of the PC 136 in FIG. 8 to produce the same new LPH value stored in the LPH register 602. A bitwise exclusive OR may be a more advantageous operation to perform than a shift operation. Note that in an example 902 in FIG. 9B, a hash of different LPH values in the LPH register 620 with different values of PCs 136 can still produce a same LPH value stored in the LPH register 602. In other words, a hash operation will be directed to indexing the same next line prefetch prediction confidence indicator 134(0)-134(P) in the prefetch prediction confidence storage circuit 132 based on the PC 136 of the memory load instruction 122 and the current LPH value in the LPH register 602.

Figure 10:
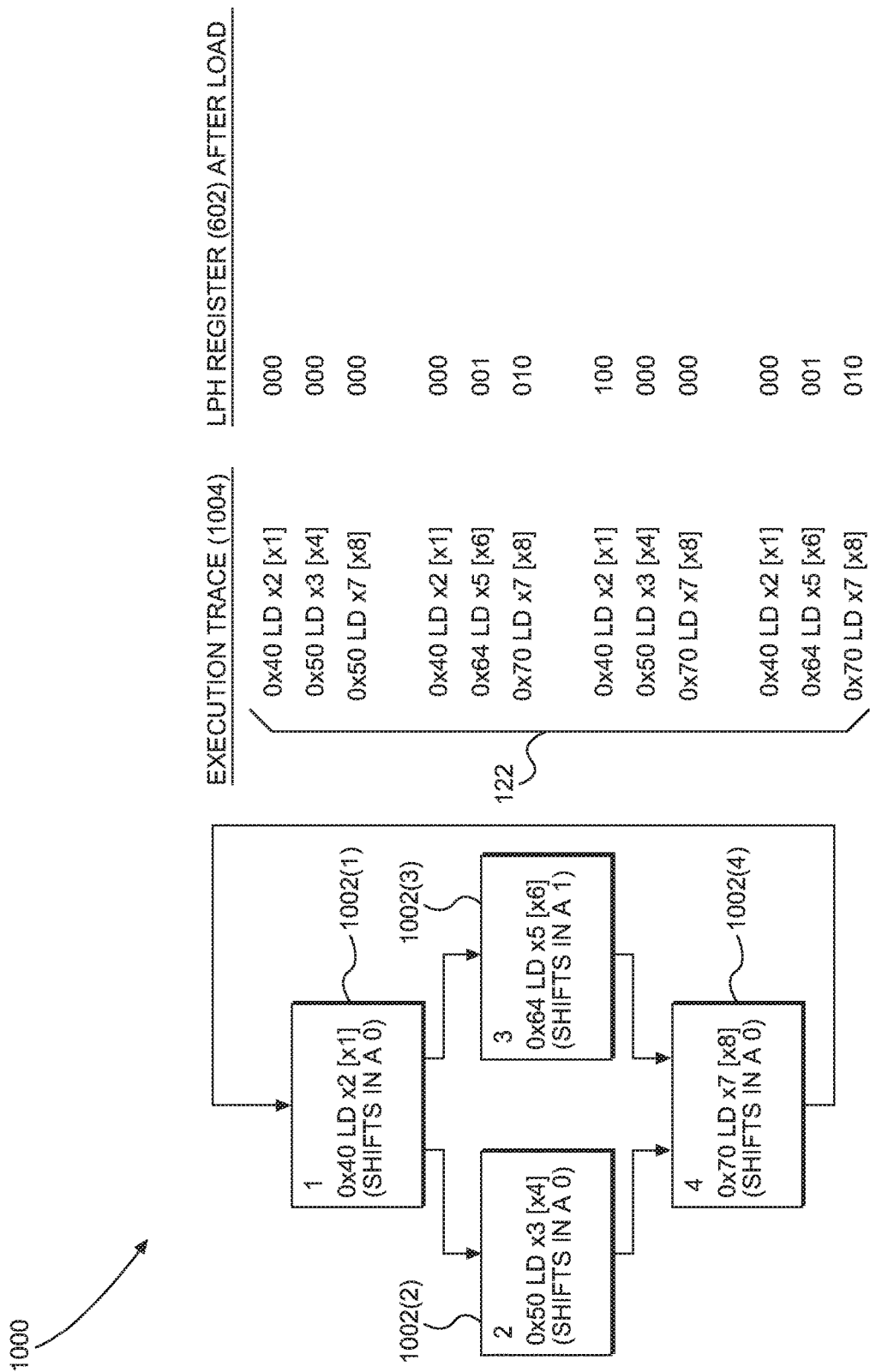
FIG. 10 illustrates an example of the LPH register in the cache memory system in FIG. 6 being updated based on a series of processed memory load instructions.

FIG. 10 illustrates an example of the LPH register 602 in the cache memory system 106(0) in FIG. 6 being updated based on a series of processed memory load instructions 122, wherein updating the LPH register 602 can provide contextual advantages. For example, FIG. 10 illustrates an example of an if-then instruction construct 1000 with memory load instructions 1002(1)-1002(4). As shown in each memory load instruction 1002(1)-1002(4), the LPH value shifted into the LPH register 602 changes for the same PC 136 of 0x70 as shown in an execution trace 1004 of the if-then instruction construct 1000. Thus, if instances of execution of the memory load instructions 1002(1)-1002(4) tend to be repeated for the same memory load address depending on the nature of execution (e.g., 0x08), different next line prefetch prediction confidence indicators 134(0)-134(P) may be accessed in the prefetch prediction confidence storage circuit 132 based on the LPH register 602 to also provide contextual history as part of tracking prediction confidence.

Next line prefetchers employing initial high prefetch prediction confidence states for throttling next line prefetches in a process-based system according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 11:
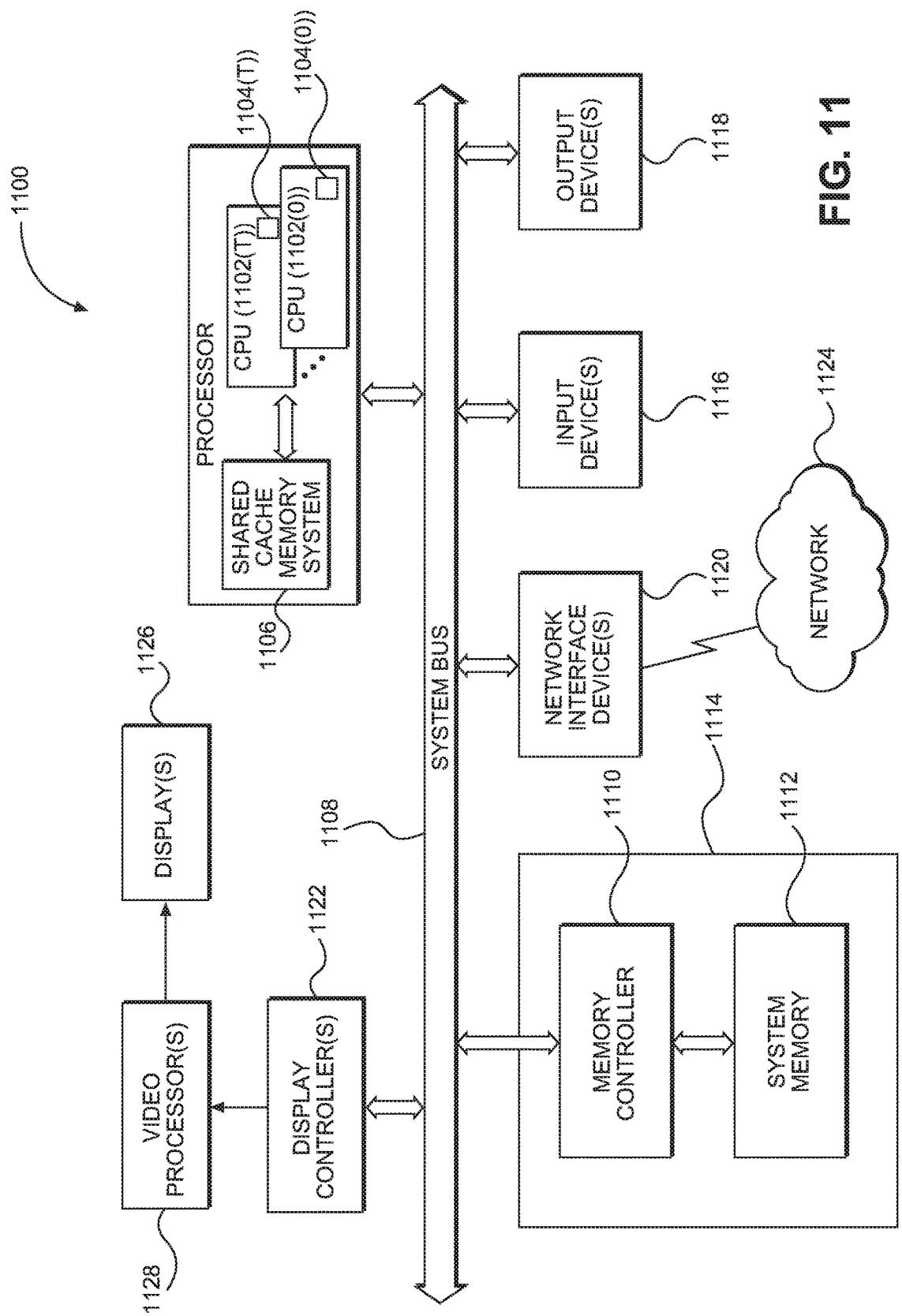
FIG. 11 is a block diagram of an exemplary processor-based system that can include a cache memory system(s) that includes a next line prefetch circuit configured to throttle next line prefetching of data into a higher level memory based on a next line prefetch prediction confidence indicator that is initially set to a high prefetch prediction confidence state, including the cache memory system in FIGS. 1 and 6.

In this regard, FIG. 11 illustrates an example of a processor-based system 1100 that includes one or more CPUs 1102(0)-1102(T) that each employ a cache memory system 1104(0)-1104(T) that includes a next line prefetch circuit configured to throttle next line prefetching based on a prefetch prediction confidence state that is initially set to a high prefetch prediction confidence state. These cache memory systems 1104(0)-1104(T) can include the cache memory system 106(0) in FIG. 1. The CPUs 1104(0)-1104(T) may also be coupled to a shared cache memory system 1106. The CPUs 1104(0)-1104(T) are coupled to a system bus 1108 and can intercouple master and slave devices included in the processor-based system 1100. As is well known, the CPUs 1104(0)-1104(T) communicates with these other devices by exchanging address, control, and data information over the system bus 1108. For example, the CPUs 1104(0)-1104(T) can communicate bus transaction requests to a memory controller 1110 for accessing a system memory 1112 in a memory system 1114 as an example of a slave device. Although not illustrated in FIG. 11, multiple system buses 1108 could be provided, wherein each system bus 1108 constitutes a different fabric.

Other master and slave devices can be connected to the system bus 1108. As illustrated in FIG. 11, these devices can include the memory system 1114, one or more input devices 1116, one or more output devices 1118, one or more network interface devices 1120, and one or more display controllers 1122, as examples. The input device(s) 1116 can include any type of input device, including but not limited to input keys, switches, voice processors, etc. The output device(s) 1118 can include any type of output device, including but not limited to audio, video, other visual indicators, etc. The network interface device(s) 1120 can be any devices configured to allow exchange of data to and from a network 1124. The network 1124 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1120 can be configured to support any type of communications protocol desired.

The CPUs 1104(0)-1104(T) may also be configured to access the display controller(s) 1122 over the system bus 1108 to control information sent to one or more displays 1126. The display controller(s) 1122 sends information to the display(s) 1126 to be displayed via one or more video processors 1128, which process the information to be displayed into a format suitable for the display(s) 1126. The display(s) 1126 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A cache memory system, comprising:
a lower level cache memory; and
a next line prefetch circuit configured to:
reset a prefetch prediction confidence state to a next line prefetch state in each of one or more next line prefetch prediction confidence indicators in a prefetch prediction confidence storage circuit, the one or more next line prefetch prediction confidence indicators each associated with one or more memory load instructions and configured to store a prefetch prediction confidence state indicating either a next line prefetch state or a no next line prefetch state;
receive a memory load instruction comprising a memory read address;
receive a cache hit/miss indicator indicating if read data for the memory read address of a memory is contained in the lower level cache memory;
in response to the cache hit/miss indicator indicating the read data for the memory load instruction is not contained in the lower level cache memory, access a prefetch prediction confidence state in a next line prefetch prediction confidence indicator of the one or more next line prefetch prediction confidence indicators associated with the memory load instruction in the prefetch prediction confidence storage circuit; and
in response to the accessed prefetch prediction confidence state indicating a next line prefetch state, issue a next line prefetch request for a next prefetch memory read address from the memory read address to a higher level memory system to the lower level cache memory;
receive a next line prefetch feedback indicator from the higher level memory system indicating if a next memory read address for a next memory load instruction received by the higher level memory system matched the next prefetch memory read address; and
in response to the next line prefetch feedback indicator indicating that the next memory read address for the next memory load instruction matched the next prefetch memory read address, reset the prefetch prediction confidence state in the next line prefetch prediction confidence indicator associated with the memory load instruction to a next line prefetch state.

2. The cache memory system of claim 1, wherein, in response to the cache hit/miss indicator indicating the read data for the memory load instruction is contained in the lower level cache memory, the next line prefetch circuit is further configured to not issue a next line prefetch request to the higher level memory system.

3. The cache memory system of claim 2, wherein, in further response to the cache hit/miss indicator indicating the read data for the memory load instruction is contained in the lower level cache memory, the next line prefetch circuit is further configured to not access the prefetch prediction confidence storage circuit.

4. The cache memory system of claim 1, wherein the next line prefetch circuit is further configured to, in response to the next line prefetch feedback indicator indicating the next memory read address for the next memory load instruction did not match the next prefetch memory read address, not reset the prefetch prediction confidence state in the next line prefetch prediction confidence indicator associated with the memory load instruction to a next line prefetch state.

5. The cache memory system of claim 1, further comprising a load path history register containing a current load path history value;
the next line prefetch circuit configured to access the prefetch prediction confidence state by being configured to:
shift the current load path history value in the load path history register into a shifted load path history value;
shift a designated bit from a program counter of the memory load instruction into the shifted load path history value in the load path history register; and
access the prefetch prediction confidence state in the next line prefetch prediction confidence indicator associated with the shifted load path history value in the prefetch prediction confidence storage circuit.

6. The cache memory system of claim 1, further comprising a load path history register containing a load path history value;
the next line prefetch circuit configured to access the prefetch prediction confidence state by being configured to:
bitwise exclusive OR the load path history value with at least a portion of bits of a program counter of the memory load instruction into a hashed load path history value in the load path history register; and
access the prefetch prediction confidence state in the next line prefetch prediction confidence indicator associated with the hashed load path history value in the prefetch prediction confidence storage circuit.

7. The cache memory system of claim 1, wherein the next line prefetch circuit is configured to:
reset the prefetch prediction confidence state comprising a prefetch prediction confidence count indicating the next line prefetch state in each of the one or more next line prefetch prediction confidence indicators comprising one or more next line prefetch prediction confidence counters;
in response to the cache hit/miss indicator indicating the read data for the memory load instruction is not contained in the lower level cache memory, access the prefetch prediction confidence count in a next line prefetch prediction confidence counter among the one or more next line prefetch prediction confidence counters associated with the memory load instruction in the prefetch prediction confidence storage circuit; and
in response to the accessed prefetch prediction confidence count indicating a next line prefetch state, issue the next line prefetch request for the next prefetch memory read address from the memory read address to the higher level memory system.

8. The cache memory system of claim 7, wherein the next line prefetch circuit is configured to:
reset the prefetch prediction confidence count to zero indicating the next line prefetch state in each of the one or more next line prefetch prediction confidence counters;
in response to the cache hit/miss indicator indicating the read data for the memory load instruction is not contained in the lower level cache memory, access the prefetch prediction confidence count in the next line prefetch prediction confidence counter associated with the memory load instruction in the prefetch prediction confidence storage circuit; and
in response to the accessed prefetch prediction confidence count not being saturated, issue the next line prefetch request for the next prefetch memory read address from the memory read address to the higher level memory system.

9. The cache memory system of claim 8, wherein, in response to the accessed prefetch prediction confidence count being saturated, the next line prefetch circuit is further configured to not issue the next line prefetch request for the next prefetch memory read address.

10. The cache memory system of claim 1, wherein, in response to the cache hit/miss indicator indicating the read data for the memory load instruction is not contained in the lower level cache memory, the next line prefetch circuit is configured to access the prefetch prediction confidence state in the next line prefetch prediction confidence indicator associated with a program counter of the memory load instruction in the prefetch prediction confidence storage circuit.

11. The cache memory system of claim 1, wherein the one or more next line prefetch prediction confidence indicators comprises a single next line prefetch prediction confidence indicator.

12. The cache memory system of claim 1 further comprising the prefetch prediction confidence storage circuit.

13. The cache memory system of claim 1, wherein, in response to the accessed prefetch prediction confidence state indicating a next line prefetch state, the next line prefetch circuit is configured to issue the next line prefetch request for the next prefetch memory read address sequential to the memory read address to the higher level memory system to the lower level cache memory.

14. The cache memory system of claim 1, further comprising a cache controller comprising the next line prefetch circuit, the cache controller configured to:
 receive the memory load instruction comprising the memory read address;
 access the lower level cache memory to determine if the read data for the memory read address is contained in the lower level cache memory; and
 generate the cache hit/miss indicator indicating if the read data for the memory read address is contained in the lower level cache memory.

15. The cache memory system of claim 1 disposed into an integrated circuit (IC).

16. The cache memory system of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

17. A cache memory system, comprising:
 means for storing lower level cache data;
 means for resetting a prefetch prediction confidence state to a next line prefetch state in each of one or more next line prefetch prediction confidence indicators in means for storing a next line prefetch prediction confidence indicator, the one or more next line prefetch prediction confidence indicators each associated with one or more memory load instructions and comprising means for storing the prefetch prediction confidence state indicating either a next line prefetch state or a no next line prefetch state;
 means for receiving a memory load instruction comprising a memory read address;
 means for receiving a cache hit/miss indicator indicating if read data for the memory read address of a memory is contained in the means for storing lower level cache data;
 means for accessing a prefetch prediction confidence state associated with the memory load instruction in the means for storing the next line prefetch prediction confidence indicator, in response to the cache hit/miss indicator indicating the read data for the memory load instruction is not contained in the means for storing lower level cache data;
 means for issuing a next line prefetch request for a next prefetch memory read address from the memory read address to a higher level memory system to the means for storing the lower level cache data in response to the accessed prefetch prediction confidence state indicating a next line prefetch state;
 means for receiving a next line prefetch feedback indicator from the higher level memory system indicating if a next memory read address for a next memory load instruction received by the higher level memory system matched the next prefetch memory read address; and
 means for resetting the prefetch prediction confidence state in the next line prefetch prediction confidence indicator associated with the memory load instruction to a next line prefetch state, in response to the next line prefetch feedback indicator indicating that the next memory read address for the next memory load instruction matched the next prefetch memory read address.

18. A method of throttling next line prefetches in a processor-based system, comprising:
 resetting a prefetch prediction confidence state to a next line prefetch state in each of one or more next line prefetch prediction confidence indicators in a prefetch prediction confidence storage circuit, the one or more next line prefetch prediction confidence indicators each associated with one or more memory load instructions and configured to store a prefetch prediction confidence state indicating either a next line prefetch state or a no next line prefetch state;
 receiving a memory load instruction comprising a memory read address;
 receiving a cache hit/miss indicator indicating if read data for the memory read address of a memory is contained in a lower level cache memory;
 accessing a prefetch prediction confidence state in a next line prefetch prediction confidence indicator among the one or more next line prefetch prediction confidence indicators associated with the memory load instruction in the prefetch prediction confidence storage circuit, in response to the cache hit/miss indicator indicating the read data for the memory load instruction is not contained in the lower level cache memory;
 issuing a next line prefetch request for a next prefetch memory read address from the memory read address to a higher level memory system to the lower level cache memory, in response to the accessed prefetch prediction confidence state indicating a next line prefetch state;
 receiving a next line prefetch feedback indicator from the higher level memory system indicating if a next memory read address for a next memory load instruction received by the higher level memory system matched the next prefetch memory read address; and
 resetting the prefetch prediction confidence state in the next line prefetch prediction confidence indicator associated with the memory load instruction to a next line prefetch state, in response to the next line prefetch feedback indicator indicating that the next memory read address for the next memory load instruction matched the next prefetch memory read address.

19. The method of claim 18, further comprising not issuing a next line prefetch request to the higher level memory system in response to the cache hit/miss indicator indicating the read data for the memory load instruction is contained in the lower level cache memory.

20. The method of claim 18, further comprising not resetting the prefetch prediction confidence state in the next line prefetch prediction confidence indicator associated with the memory load instruction to a next line prefetch state, in response to the next line prefetch feedback indicator indicating the next memory read address for the next memory load instruction did not match the next prefetch memory read address.

21. The method of claim 18, comprising issuing the next line prefetch request for the next prefetch memory read address sequential to the memory read address to the higher level memory system to the lower level cache memory, in response to the accessed prefetch prediction confidence state indicating a next line prefetch state.

22. A processor-based system, comprising:
   a lower level cache memory system, comprising:
      a lower level cache memory; and
      a lower level next line prefetch circuit configured to:
         receive a memory load instruction comprising a memory read address;
         receive a cache hit/miss indicator indicating if read data for the memory read address of a memory is contained in the lower level cache memory;
         in response to the cache hit/miss indicator indicating the read data for the memory load instruction is not contained in the lower level cache memory, access a prefetch prediction confidence state in a next line prefetch prediction confidence indicator in a prefetch prediction confidence storage circuit, the next line prefetch prediction confidence indicator associated with the memory load instruction in the prefetch prediction confidence storage circuit;
         in response to the accessed prefetch prediction confidence state indicating a next line prefetch state, issue a next line prefetch request for a next prefetch memory read address from the memory read address to a higher level memory system to the lower level cache memory;
         receive a next line prefetch feedback indicator from the higher level memory system indicating if a next memory read address for a next memory load instruction received by the higher level memory system matched the next prefetch memory read address; and
         in response to the next line prefetch feedback indicator indicating the next memory read address for the next memory load instruction matched the next prefetch memory read address, reset the prefetch prediction confidence state in the next line prefetch prediction confidence indicator associated with the memory load instruction to a next line prefetch state; and
   a higher level memory system, comprising:
      a higher level cache memory; and
      a higher level next line prefetch circuit configured to:
         receive the next line prefetch request for the next prefetch memory read address;
         receive a cache hit/miss indicator indicating if read data for the next prefetch memory read address is contained in the higher level cache memory; and
         in response to the cache hit/miss indicator indicating the read data for the next prefetch memory read address is not contained in the higher level cache memory:
            request next read data at the next prefetch memory read address in the higher level memory system to the higher level cache memory;
            receive a next memory load instruction having a next memory read address;
            determine if the next memory read address matches the next prefetch memory read address; and
            in response to the next memory read address matching the next prefetch memory read address:
               store the next read data at the next prefetch memory read address from the higher level memory system in the higher level cache memory; and
               send the next line prefetch feedback indicator indicating the next memory read address for the next memory load instruction matched the next prefetch memory read address.

23. The processor-based system of claim 22, wherein, in response to the cache hit/miss indicator indicating the read data for the next prefetch memory read address is not contained in the higher level cache memory, the higher level next line prefetch circuit is further configured to store the next read data at the next prefetch memory read address in the higher level memory system in a data buffer entry in a data buffer comprising one or more data buffer entries.

24. The processor-based system of claim 23, wherein, in response to the next memory read address matching the next prefetch memory read address, the higher level next line prefetch circuit is further configured to invalidate the data buffer entry in the data buffer.

25. The processor-based system of claim 22, wherein,
   in response to the cache hit/miss indicator indicating the read data for the next prefetch memory read address is contained in the higher level cache memory, the higher level next line prefetch circuit is further configured to send the next line prefetch feedback indicator indicating the next memory read address for the next memory load instruction did not match the next prefetch memory read address; and
   in response to the next line prefetch feedback indicator indicating the next memory read address for the next memory load instruction did not match the next prefetch memory read address, the lower level next line prefetch circuit is further configured to not reset the prefetch prediction confidence state in the next line prefetch prediction confidence indicator associated with the memory load instruction to a next line prefetch state.

26. The processor-based system of claim 23, wherein;
   in response to the next memory read address not matching the next prefetch memory read address, the higher level next line prefetch circuit is configured to send the next line prefetch feedback indicator indicating the next memory read address for the next memory load instruction did not match the next prefetch memory read address; and
   in response to the next line prefetch feedback indicator indicating the next memory read address for the next memory load instruction did not match the next prefetch memory read address, the lower level next line prefetch circuit is further configured to not reset the prefetch prediction confidence state in the next line prefetch prediction confidence indicator associated with the memory load instruction to a next line prefetch state.

27. The processor-based system of claim 26, wherein, in response to the next memory read address not matching the next prefetch memory read address, the higher level next line prefetch circuit is further configured to:
- determine if a data buffer among the one or more data buffer entries has an available data buffer entry; and
- in response to determining that the data buffer does not have an available data buffer entry, send the next line prefetch feedback indicator indicating the next memory read address for the next memory load instruction did not match the next prefetch memory read address.

28. The processor-based system of claim 22, wherein the higher level next line prefetch circuit is further configured to reset the prefetch prediction confidence state to a next line prefetch state in each of one or more next line prefetch prediction confidence indicators in response to the next memory load instruction matching the next prefetch memory read address.

29. The processor-based system of claim 22, wherein, in response to the cache hit/miss indicator indicating the read data for the memory load instruction is contained in the lower level cache memory, the lower level next line prefetch circuit is further configured to not issue a next line prefetch request to the higher level memory system.

30. The processor-based system of claim 29, wherein, in further response to the cache hit/miss indicator indicating the read data for the memory load instruction is contained in the lower level cache memory, the lower level next line prefetch circuit is further configured to not access the prefetch prediction confidence storage circuit.

\* \* \* \* \*